(12) United States Patent
Khojastepour et al.

(10) Patent No.: US 9,736,785 B2
(45) Date of Patent: Aug. 15, 2017

(54) DEGREES OF FREEDOM IN MULTICELL WIRELESS SYSTEMS WITH FULL-DUPLEX BASE STATIONS USING INTERFERENCE ALIGNMENT AND METHODS FOR ENABLING FULL-DUPLEX WITH HALF DUPLEX CLIENTS

(71) Applicant: NEC Laboratories America, Inc., Princeton, NJ (US)

(72) Inventors: Mohammad Khojastepour, Lawrenceville, NJ (US); Karthikeyan Sundaresan, Howell, NJ (US); Eugene Chai, Princeton, NJ (US); Sampath Rangarajan, Bridgewater, NJ (US)

(73) Assignee: NEC Corporation, Tokyo (JP)

( * ) Notice: Subject to any disclaimer, the term of this patent is extended or adjusted under 35 U.S.C. 154(b) by 221 days.

(21) Appl. No.: 14/560,723

(22) Filed: Dec. 4, 2014

(65) Prior Publication Data
US 2015/0223173 A1    Aug. 6, 2015

Related U.S. Application Data

(60) Provisional application No. 61/911,627, filed on Dec. 4, 2013, provisional application No. 61/949,613, filed on Mar. 7, 2014.

(51) Int. Cl.
*H04W 52/14*    (2009.01)
*H04B 7/0413*    (2017.01)
(Continued)

(52) U.S. Cl.
CPC .......... *H04W 52/14* (2013.01); *H04B 7/0413* (2013.01); *H04B 7/0421* (2013.01);
(Continued)

(58) Field of Classification Search
CPC .... H04B 7/022; H04B 7/0413; H04B 7/0421; H04B 7/0456; H04B 7/0619;
(Continued)

(56) References Cited

U.S. PATENT DOCUMENTS

| | | | |
|---|---|---|---|
| 2012/0077485 A1* | 3/2012 | Shin ...................... | H04B 7/0617 455/422.1 |
| 2012/0281780 A1* | 11/2012 | Huang ................. | H04B 7/0452 375/267 |

(Continued)

OTHER PUBLICATIONS

Senaratne et al., "Beamforming for Space Division Duplexing", IEEE ICC 2011 proceedings, 2011.*
(Continued)

*Primary Examiner* — Faruk Hamza
*Assistant Examiner* — Saad A Waqas
(74) *Attorney, Agent, or Firm* — Joseph Kolodka

(57) ABSTRACT

An interference alignment system for communication structures that includes a single cell channel comprising an access point node, and a full bipartite interference channel (FBIC) configuration of a plurality of receiving nodes and a plurality of transmitting nodes. Each receiving node sees an interfering signal from all transmitting nodes. The access point node of the single cell channel provides a single node having downlink channels to all receiving nodes in the FBIC, and all of the uplink channels from the FBIC are to the single access point node to the single cell channel.

15 Claims, 19 Drawing Sheets

(51) Int. Cl.
  H04B 7/0456    (2017.01)
  H04B 15/00     (2006.01)
  H04L 5/16      (2006.01)
  H04W 72/04     (2009.01)
  H04W 72/08     (2009.01)
  H04B 7/04      (2017.01)
  H04L 5/00      (2006.01)
  H04W 52/24     (2009.01)
  H04B 17/345    (2015.01)
  H04B 7/022     (2017.01)
  H04B 7/06      (2006.01)

(52) U.S. Cl.
  CPC ........... *H04B 7/0456* (2013.01); *H04B 15/00* (2013.01); *H04L 5/0048* (2013.01); *H04L 5/16* (2013.01); *H04W 72/0406* (2013.01); *H04W 72/082* (2013.01); *H04B 7/022* (2013.01); *H04B 7/0619* (2013.01); *H04B 17/345* (2015.01); *H04W 52/241* (2013.01)

(58) Field of Classification Search
  CPC ............... H04W 52/14; H04W 52/241; H04W 72/0406; H04W 72/082
  USPC .................................................. 370/278, 329
  See application file for complete search history.

(56) References Cited

U.S. PATENT DOCUMENTS

| | | | | |
|---|---|---|---|---|
| 2013/0322301 | A1* | 12/2013 | Ghauri | H04W 16/14 370/280 |
| 2014/0098900 | A1* | 4/2014 | Bayesteh | H04B 7/0452 375/267 |
| 2014/0349581 | A1* | 11/2014 | Oh | H04L 25/03343 455/63.1 |
| 2014/0376655 | A1* | 12/2014 | Ruan | H04L 1/06 375/267 |
| 2015/0071368 | A1* | 3/2015 | Lau | H04B 7/0417 375/267 |
| 2015/0139347 | A1* | 5/2015 | Murch | H04B 7/0452 375/267 |
| 2015/0195047 | A1* | 7/2015 | Bahl | H04B 7/0452 375/267 |
| 2015/0215016 | A1* | 7/2015 | Hunukumbure | H04L 5/0023 370/280 |
| 2015/0358057 | A1* | 12/2015 | Lindqvist | H04B 7/024 370/329 |

OTHER PUBLICATIONS

Cadambe and Jafar, "Interference Alignment and Degrees of Freedom of the K-User Interference Channel," IEEE Transactions on Information Theory, vol. 54, No. 8, Aug. 2008. (pp. 3425-3440).

* cited by examiner

DEGREES OF FREEDOM IN MULTICELL WIRELESS SYSTEMS WITH FULL-DUPLEX BASE STATIONS USING INTERFERENCE ALIGNMENT AND METHODS FOR ENABLING FULL-DUPLEX WITH HALF DUPLEX CLIENTS

RELATED APPLICATION INFORMATION

This application claims priority to provisional application Ser. No. 61/949,613 filed on Mar. 7, 2014, which is incorporated herein by reference, and provisional application Ser. No. 61/911,627 filed on Dec. 4, 2013, which is also incorporated herein by reference.

BACKGROUND

Technical Field

The present invention relates to strategies for enabling full duplex wireless systems. More particularly, the present disclosure is related to using interference alignment for enabling duplex wireless systems and/or enabling full duplex wireless systems using half duplex clients.

Description of the Related Art

In order to increase the spectral efficiency in wireless communication systems, several improvements have been performed in the past decades. Besides having better coding and modulation schemes, using feedback, and multiuser interference cancellation, the most notable strategy has been the use of multiple antenna systems. Multiple input multiple output (MIMO) systems can generate a more reliable channel through diversity in transmitting the signal in multiple channels between the transmit and receive antennas, where each channel goes through a different path and potentially has independent fading or moderate to low correlation to other signal paths. The use of MIMO has shown to increase the capacity as well, where multiple signal streams are transmitted in different spatial dimension of the channel. Nonetheless, increasing the number of antennas results in more complicated demodulation, and decoding scheme that is very hard to achieve the optimal performance in practical systems. Hence, the practical use of multi stream transmission is limited to maximum of two streams in current standards (for example release 12 LTE and all prior releases). More transmit and receive antennas can be used for precoding or beam forming, e.g., up to 4 antennas in release 9 LTE and 8 antennas in release 11 LTE. Yet, increasing the number of antennas increases the hardware complexity and cost, and each antenna requires a separate transmit and receive RF chains.

SUMMARY

The present disclosure is directed to increasing spectral efficiency in wireless communication systems. In one embodiment, an interface alignment system for communication structures is provided that includes a single cell channel comprising an access point node and a full bipartite interference channel (FBIC) configuration of a plurality of receiving nodes and a plurality of transmitting nodes, wherein each receiving node sees an interfering signal from all transmitting nodes. The access point to the single cell channel provides a single node having downlink channels to all receiving nodes in the FBIC configuration, and all of the uplink channels from the FBIC channel are to the single node that provides the access point to the single cell channel.

In another aspect of the present disclosure, a method of full-duplex communication in a wireless network is provided that may include simultaneous transmission to a plurality of receiving users and simultaneously receiving from a plurality of transmitting users in full duplex, wherein the transmission of the transmitting users are aligned at the receiving users. In some embodiments, the plurality of transmitting users and the plurality of receiving users are half duplex. Each user may be equipped with multiple antenna and alignment of interfering signal of the transmitting users at the receiving users can be performed in spatial domain. Linear precoding or filtering may also be used at the transmitters or the receivers to mitigate the interference. In some embodiments, the plurality of transmitting users and receiving users may be composed of two transmitting users and two receiving users that are active. The alignment that is performed by at least one of communication nodes may be in a distributed manner. The control signal may be communicated between the users directly.

In yet another aspect of the present disclosure, a computer program product is provided that includes a computer readable storage medium having computer readable program code embodied therein for performing a method of full-duplex communication in wireless network. The method may include simultaneous transmission to a plurality of receiving users and simultaneously receiving from a plurality of transmitting users in full duplex, wherein the transmission of the transmitting users are aligned at the plurality of receiving users. In some embodiments, the plurality of transmitting users and the plurality of receiving users may be half duplex.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
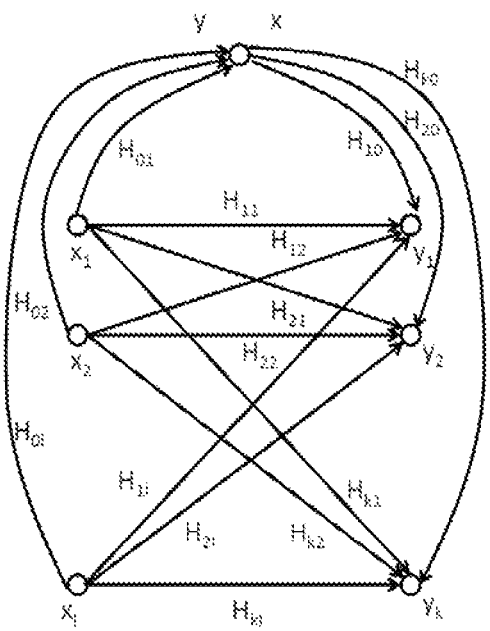
FIG. 1 is a schematic of a single cell channel, in accordance with one embodiment of the present disclosure.

One of the main challenges in deployment of full duplex systems in a network is the scaling of the promised doubling of the spectral efficiency by the full duplex operation when multi-user communication and multiple antenna systems are considered. In one aspect, the methods, systems and computer program products disclosed herein address a practical way of solving this challenge in a wireless system consisting of a single cell or multiple cells with a full duplex access points. Interface alignment is proposed where all the uplink nodes attempt to align their interferences only on a subset of resolvable degrees of freedom of each downlink user.

Further, enabling wireless full-duplex (from an access point (AP)) with multiple half duplex (HD) clients is key to widespread adoption to full-duplex (FD) commercial networks. However, enabling FD in such networks is fundamentally challenged by a new form of uplink-downlink interference (UDI) that arises between HD clients operating simultaneously in the uplink and downlink directions of the full-duplex network. In this context, it is shown that spatial interference alignment (IA) between clients is an effective and scalable technique to address the uplink-downlink interference (UDI), and hence enable full duplex (FD) in these networks, especially in the presence of multiple input multiple output (MIMO) scenarios. In some embodiments, the methods, systems and computer program products that are disclosed herein provide full-duplex without strings (FDoS). In some embodiments, the methods, systems and computer program products build the theory of applying spatial interference alignment (IA) to full duplex methods in general and present elegant, implementation friendly constructions for generating feasible interface alignment (IA) solutions that leverage the structure of interference specific to these networks. In the process, the full-duplex without strings (FDoS) system shows that four half duplex (HD) clients are both necessary and sufficient to eliminate UDI through IA and enable 2N streams at an N transceiver access point (AP). FDoS systems also enable an efficient media access control (MAC) design at the AP to handle clients with heterogeneous antenna capabilities, maximize the throughput of the enabled streams in the full duplex (FD) session, as well as reduce the overhead incurred in FDoS by half by facilitating a distributed implementation. One key feature of the disclosed methods and system is to realize full duplex communication between multiple users that are in the same interference domain. This feature allows the gain of full duplex technology to scale with the increasing number of users.

It should be understood that embodiments described herein may be entirely hardware or may include both hardware and software elements, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor, e.g., a hardware processor, coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

The use of full duplex systems can potentially revolutionize the hard threshold on spectral efficiency where in theory the spectral efficiency of a single link can be doubled in comparison to half duplex (HD) systems. A "duplex communication system" is a point-to-point system composed of two connected parties or devices that can communicate with one another in both directions. There are two types of duplex communication systems: full-duplex and half-duplex. In a full duplex system, both parties can communicate to the other simultaneously. In a half-duplex system, in contrast, each party can communicate to the other, but not simultaneously; the communication is one direction at a time. Recent work on FD wireless systems has considered the use of multiple antennas for cancellation of the self interference (SI), however the number of RF chains would not increase for the additional antennas used for the purpose of SI cancellation. The comparison of a multiple antenna system working in HD or FD shows the benefit of either technology in different scenarios considering their algorithmic and hardware complexity. One issue is finding ways to enable FD without sacrificing MIMO performance. Another important problem is enabling multi user communications in FD systems that seem to be a bottleneck in achieving the promised 2 times spectral efficiency for single link FD system. The main issue is that when multiple users are communicating with a single node (base-station or access point), their uplink signal causes interference to the downlink signal transmitted from the access point which are now both in the same frequency band. Therefore, the main problem is to address the uplink interference in the downlink transmissions. This issue has been noticed and formalized be several prior works. A prior art in addressing the uplink interference in downlink transmission uses a different frequency band that is not used by the base station to share the uplink interference signal between the users. This solution relies on availability of a different frequency band and the assumption that this band cannot or may not be used by the access point.

In some embodiments, the methods, systems and computer program products disclosed herein address the self interference by interference alignment and cancellation. In some embodiments, the methods, systems and computer program products disclosed herein propose a scheme that requires less signaling between the users and access point, which can be done in the same frequency band that is used by the access point. In some embodiments, the channel state information between the users is used by the methods disclosed herein in a central entity, e.g., the access point, to compute a set of precoders to be used by the users and access point with the goal of eliminating or reducing interference of the uplink users on the downlink transmission. In some embodiments, each involved uplink user sacrifices part of its degrees of freedom (the number of independent streams that could be transmitted in the uplink) in order to align its interference with other involved uplink users on the downlink users leaving the downlink users with some degrees of freedom (the number of independent streams that can be received by a downlink user).

Figure 5:
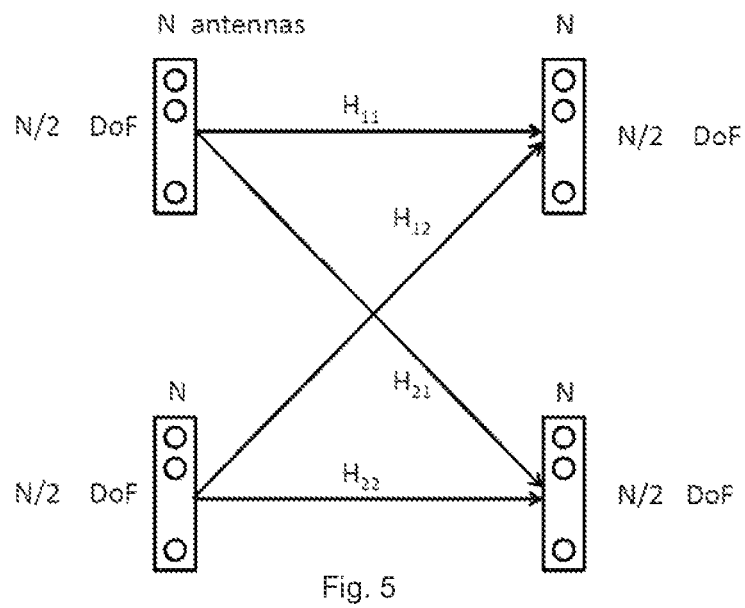
FIG. 5 is a schematic depicting the degrees of freedom available in one embodiment of a symmetric 2,2 FBIC.

In some embodiments, constructing a full duplex node can be more efficient and can be easier for the access points and it is desirable to have half duplex clients for the sake of simplicity, power consumption, as well as better handling of the mobility. In one example, the methods, systems and computer program products disclosed herein present a scheme in which four users are picked from the pool of users. For the sake of simplicity, it is assumed that each user and the access point have N antennas. The case of users and access points with different number of antennas can be handled similarly. For example, it can be scheduled that two users are in the uplink and two users are in the downlink. By using interference alignment two uplink users only use N/2 out of their N degrees of freedom to transmit data in the uplink to the access point, while by using a linear precoding, they align the interference that they cause to the two downlink users in only N/2 dimensions such that each downlink user is left with N/2 degrees of freedom to receive streams from the access points, as depicted in FIG. 5. FIG. 5 depicts the degrees of freedom available in one embodiment of a symmetric 2,2 FBIC. As a result the total of 2N degrees of freedom can be used to transmit 2N streams, where N degrees of freedom are used in the uplink and N degrees of freedom are used in the downlink. It is noted that in prior art systems using MU-MIMO (multi-user MIMO), only N degrees of freedom can be achieved in either downlink or uplink. Even if interference cancellation or interference alignment is used in conjunction with MU-MIMO, the maximum degrees of freedom would remain as N. Hence, the use of full-duplex access point can in fact double the spectral efficiency in a single cell by using intelligent interference alignment technique.

The methods, systems and computer program products employ a revolutionary fact that doubling the number of possible transmit and receive streams is possible. More particularly, in the high signal to noise ratio (SNR) regime, the scaling of a total transmit and receive information by a full duplex access point in a single cell is twice as much as that of a half-duplex access point in a single cell. The methods, structures and systems disclosed herein characterize the achievable and maximum possible scaling factor in multi-cell systems.

Although the focus of the methods, systems and computer program produces may be on the degrees of freedom achievable through transmit and receive precoder (filter) design, the actual design of the precoders may be considered in terms of other system measures, such as the received signal power RSSI, signal to noise ratio, or a capacity measure. For simplicity of the discussion and without loss of generality, the precoders may be considered to be semi-orthogonal matrices, which means they are formed by selecting rows or columns of a unitary matrix. However, in other embodiments, given a total dimension of a precoder, the precoder does not have to be a semi-unitary matrix. In other words, the rows or columns of the precoding matrices might not be orthogonal. The latter condition would allow for the design of more efficient filters that can achieve, e.g., better capacity or throughput in low or mid range of signal to noise ratio. Nonetheless, all such precoders would follow the same degree of freedom at high SNR and have the same scalability factor. In some embodiments, it is possible to perform the interference alignment in distributed form, in which each node performs the calculation of the precoders individually or based on some feedback from other nodes.

In some embodiments, the methods, systems and computer program products employs a channel model that considers a communication channel consisting of L transmitting nodes which have intended signal for a single node called access point or base station and K receiving nodes that receive signal from the same access point. A memory less channel is considered to be present between all pair of the nodes that can be accessed simultaneously and the transmission is received by a single node from all transmitting point that are active simultaneously. This means that part of the channel may be used by considering some of the transmit signals to be zero, for example, when the access point works in half duplex mode it can either transmit to all or a subset of receiving nodes and the access point will not receive any signal from the transmitting point. However, in the same scenario, if the transmitting node beside the access point start a simultaneous transmission with the access point it would cause an interference with the potential receiving points. A half duplex access point can also receive from all or a subset of transmitting points when it has stopped transmission to the receiving nodes. The transmitting node may also be called the uplink nodes or uplink users and the channel between these nodes and the access point is also called uplink channel. Similarly, the receiving node may also be called downlink nodes or downlink users and the channel between them and the access point is called downlink channel.

A full duplex access point can transmit in the downlink while it receives in the uplink. However, the situation where a full duplex access point is used is very different from the case where a half duplex access point is deployed. In the latter case, the uplink channel is used separately from the downlink channel, hence, there is no interference in on the downlink users from the uplink transmission. However, in the former case, where a full duplex access point is used, the possibility of using the full potential of the downlink and uplink channel simultaneously is limited by the fact that the downlink users are suffered from the interference caused by the uplink transmissions.

The following description provides some embodiments of how the methods, systems and computer program products disclosed herein address an interference management technique in a single or multiple cells where the communication channel in each cell is defined by the channel model presented in this section.

Figure 2:
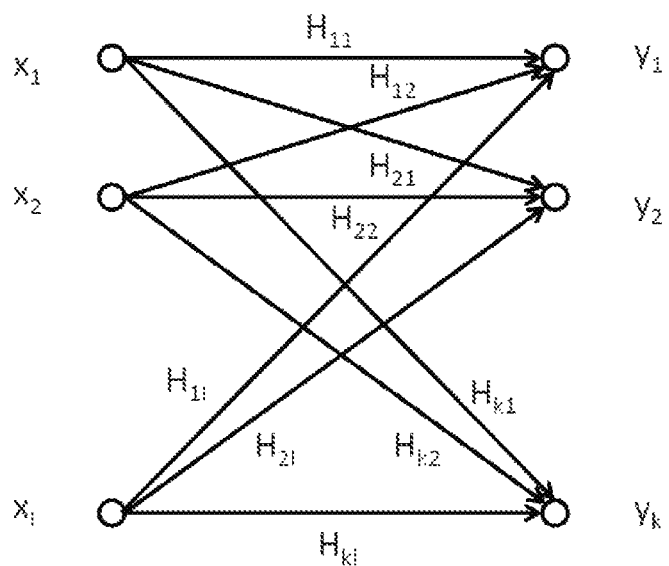
FIG. 2 is a schematic of a full bipartite interference channel (FBIC), in accordance with one embodiment of the present disclosure.

As it is illustrated in the schematic of the single cell channel (SCC) that is depicted in FIG. 1, the channel $H_{11}$, $H_{12}$, $H_{21}$, $H_{22}$, $H_{11}$, $H_{21}$, $H_{k1}$, $H_{k2}$, is composed of a full bipartite graph between the uplink nodes and downlink nodes, as well as a multiple access channel $H_{0l}$, $H_{02}$, $H_{01}$ from all the uplink nodes $x_1$, $x_1$, $x_2$, to the access point y, x, and a broadcast channel $H_{0l}$, $H_{02}$, $H_{01}$ from the access point y,x to all downlink nodes $y_1$, $y_1$, $y_2$. Since the interference management is the crucial part of enabling full duplex communication in a single cell, we concentrate on the possible degrees of freedom that are achievable in the full bipartite interference channel (FBIC) between uplink and downlink nodes, which is illustrated in FIG. 2. Considering only the FBIC (FIG. 2), the received signal at each downlink node j, j=1, 2, . . . , K is given by:

$$y_j = \Sigma_{i=1}^{L} H_{ji} x_i + z_j \qquad \text{Equation (1)}$$

where $y_j$ is a vector of size $N_{r,j}$, $X_i$ is the vector of transmit signal of size $N_{t,i}$, and $H_{ji}$ represent the channel between the transmitter I and the receiver j that is a matrix of size $N_{r,j} \times N_{t,i}$ with entries that are independent and identically distributed (i.i.d.) circularly symmetric complex numbers with mean zero and variance $\sigma^2$. The total received signal in the original single cell channel (SCC) illustrated in FIG. 1 with transmission from the access point is given by:

$$y_j + H_{j0} x_0 \qquad \text{Equation (2)}$$

where $x_0$ is the transmitted vector from the access point and $H_{j0}$ is the channel from the access point to the receiver j. The received signal at the access point is given by:

$$y_0 = \Sigma_{i=1}^{L} H_{0i} X_{0i} \qquad \text{Equation (3)}$$

where $y_0$ is a vector of size $N_{r,0}$ and $H_{0i}$ represent the channel between the transmitter i and the access point. The noise at each receiver is represented by $z_j$ (subscript zero means the access point) that is a vector of zero mean unit variance circularly symmetric complex white Gaussian noise.

Interference Alignment in FBIC

In order to maximize the uplink and downlink throughput, the interference received at the downlink users from the uplink nodes have to be mitigated. Different approaches for interference alignment exist that could include symbol level interference alignment, e.g., by using lattice codes, or by using linear precoding to mitigate interference in time domain, subcarrier domain, space domain (for multiple antenna systems) or a combination of the three. The interference management in time domain might need the use of channel extension, and assumption of having time varying channel. There are several practical consideration with channel extension in time domain. For example, the channel has to be time varying with a rate that we get enough random channel realization in order to perform linear precoding and possible interference alignment that is effective, while the assumption of knowing the channel at the transmitter forces a slow variation in the channel so that the channel can be estimated and more importantly to have small channel estimation overhead in comparison to the time that the channel estimates are valid to be used for the actual data transmission.

The interference alignment in the subcarrier domain may be done similarly as the one in the space domain. Therefore, it is possible to consider subcarriers as different antennas and convert the system to a multiple antenna system with a larger number of antennas. It is noted that this transformation might change the channel properties, e.g., it might introduce a correlation between the channel coefficients.

Figure 3:
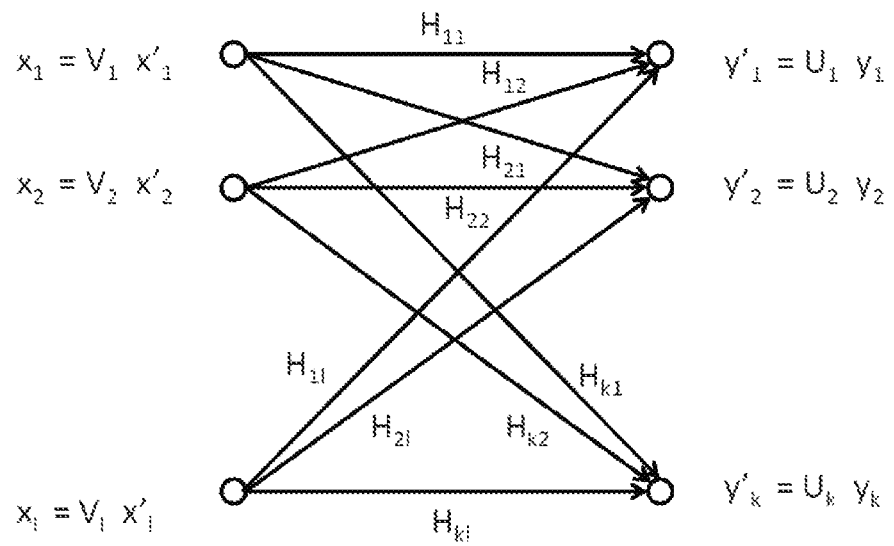
FIG. 3 is a schematic of a full bipartite interference channel (FBIC) including transmit and receive precoding filters and interpretation of channel reduction, in accordance with one embodiment of the present disclosure.

For practical reason, we focus on the interference alignment in space domain where the channel coefficients are fixed. We consider a fixed precoder per block or multiple block of transmission within the channel coherence time where the channel coefficients are approximately constant. As shown in FIG. 3, a transmit precoding matrix $V_i$, i=1, 2, . . . , L is considered at each transmission node and a receiver filter or a receive precoding matrix $U_j$, j=1, 2, . . . , K at each receiving node. FIG. 3 depicts full bipartite interference channel (FBIC) depicting transmit and receive precoding filters and interpretation of channel reduction. The transmit precoding matrices $V_i$ are of dimensions $N_{t,i} \times d_{t,i}$ where $d_{t,i} \leq N_{t,i}$ and receive filters $U_j$ are of dimension $d_{r,j} \times N_{r,j}$. It is noted that the precoding matrices $V_i$ and $U_j$ are both required to be full rank, and for simplicity are considered to be semi-orthogonal matrices, which means that the rows of $U_j$ (the columns of $V_i$) are orthonormal (mutually orthogonal and have unit norm). The alignment condition is then given by:

$$U_i H_{ij} V_j = 0 \quad \forall i=1,2,\ldots,L, \text{ and } j=1,2,\ldots,K \qquad \text{Equation (4)}$$

It is noted that the alignment conditions may be written in terms of rows of $U_j = [u_j^1 u_j^2 \ldots u_j^{d_{r,j}}]$ and columns of $V_j = [v_j^1 v_j^2 \ldots v_j^{d_{r,j}}]$. Under these circumstances, all vectors $u_i^a$ and $v_j^b$ for a given i and j and for all indices a and b satisfy the same equation:

$$u_i^a H_{ij} v_j^b = 0 \quad \text{Equation (5)}$$

In some embodiments, the above condition provides two conditions that can be necessary. First, the degrees of freedom of a receiving node j that is the number of independent vectors cannot be more than the dimension of the vector space that contains this vector, hence $d_{t,j} \leq N_{t,j}$. Similarly, for $u_i^a$ we have $d_{r,i} \leq Nr$, I that can be the second necessary condition. There are two more conditions that can be deduced from Equation (5). In some embodiments, a third necessary condition may be given by $d_{r,i} + d_{t,j} \leq \max N_{r,i}, N_{t,j}$. This is true due to the fact that if $N_{r,i} \geq N_{t,j}$ for a given i and j all vectors $H_{ij} v_j^b$ have to be linearly independent since $H_{ij}$ is generic and furthermore they are orthogonal to all $u_i^a$, which means that the total number of such vectors are less than the dimension of the vector $u_i^a$ that is $N_{r,i}$.

In some embodiments, the fourth necessary condition may be obtained by counting the number of scalar variables and scalar equations or constraint that the variable have to satisfy. The intuition obtained from the linear algebra is that a system of linear equation most likely does not have a solution if the number of variables are less than the number of constraint is the coefficients of the equations are generic. In some embodiments, it is possible to consider a set of constraints that are not linearly independent, e.g., if the coefficients are not generic, which means that the system might have a solution when there are artificially more constraints than the variables but in fact the number of algebraically independent constraints are in fact lower than the number of variables.

The number of variables in a subset of equations S between the transmit and receiving node pair (i, j) is given by $\Sigma_{i:(i,j) \in I} d_{t,i}(N_{t,i} - d_{t,i}) + \Sigma_{i:(i,j) \in I} d_{t,i}(N_{r,i} - d_{r,i})$ where:

$$S \subseteq M = \{(i,j), 1 \leq i \leq L, 1 \leq j \leq K\} \quad \text{Equation (6)}$$

The number of scalar equation in the same set is given by $\Sigma_{i:(i,j) \in I} d_{t,i} d_{r,j}$. Therefore, the fourth necessary condition can be provided by:

$$\Sigma_{i:(i,j) \in I} d_{t,i}(N_{t,i} - d_{t,i}) + \Sigma_{j:(i,j) \in I} d_{r,i}$$
$$(N_{r,i} - d_{r,i}) \geq \Sigma_{i,j:(i,j) \in I} d_{t,i} d_{r,j} \forall \subseteq \mathcal{M} \quad \text{Equation (7)}$$

In the case that multiple cells are deployed, the coordination between the access point can be key. For example, considering a traditional half duplex system with multiple cells. The interference caused by the users or access point in one cell will affect the users and the access point in the other cell, hence the achievable throughput in adjacent cell can drop. However, the coordination between the access point can potentially make the system to work as a multiple antenna system, where the antennas are distributed in different locations. The level of coordination between the access point, however, is a function of available backhaul (its capacity and its latency) between the access points. The Coordinated Multi-Point (CoMP) transmission and reception has been one of the study items in recent standards. The downlink CoMP is usually easier to implement due to the fact that all precoding calculations and encoding process may be performed at a central location, and then forwarded to the access points that are involved in transmission. On the other hand, realization of uplink CoMP with processing in a central location may require transmission of the received signals in the backhaul. Since the computed signals in downlink CoMP are in digital form it is usually much easier to be sent in the backhaul while the dimension of the uplink received signals even after analog-to-digital conversion are much larger than the signals that need to be transmitted to enable downlink CoMP. Therefore, it might be desirable to also consider systems that deploy downlink CoMP, but not the uplink CoMP. In some embodiments of the systems, methods and computer program products disclosed herein, it is assumed that full downlink and uplink CoMP is deployed by base stations in either scenario of systems with half duplex access points or full duplex access points.

The full bipartite interference channel (FBIC) that has been described above with reference to FIGS. 1, 2, 3 and 5 is distinguishable from typical interference channels. The channels may seem to have similarities at a first glance. Both channels are multi-user channel, there are a set of transmitters and another set of nodes that are receivers. Each receiver sees multiple interfering signals. However, there the number of transmitting nodes and receiving nodes in a conventional, i.e., non-FBIC, interference channel are always equal, and there is a one to one correspondence between each transmitting node to a receiving node. The intended signal that are received by each receiver is the signal that is transmitted from the corresponding transmitting point. Therefore, with for example K transmit-receive pairs, there are only K degrees of freedom in the channel where degrees of freedom are in fact associated with K direct links between the corresponding transmit and receive pairs.

However, the degrees of freedom for an FBIC channel may be defined per node. This means that that the degrees of freedom for each transmitting node can be equal, but the degrees of freedom for the receiving nodes can be different. For example, the degrees of freedom of each of the transmitting node could be equal to 2, while degrees of freedom of all receiving nodes can be equal to 1. This means that each transmitting node can in fact transmit in two independent and orthogonal direction. While the transmitting node interferes with all receiving nodes, the transmitting node of the FBIC channel provides at least with one degree of freedom, or one channel direction, that is interference free, and hence can be used by another node, e.g., the access point to receive information. This situation is very different from the one in the (non-FBIC) interference channel, where degrees of freedom are defined per direct link between the corresponding transmit-receive pair, and it is not useful to have a transmit precoder or a receive filter that is potentially has larger dimension than the other one.

Figure 4:
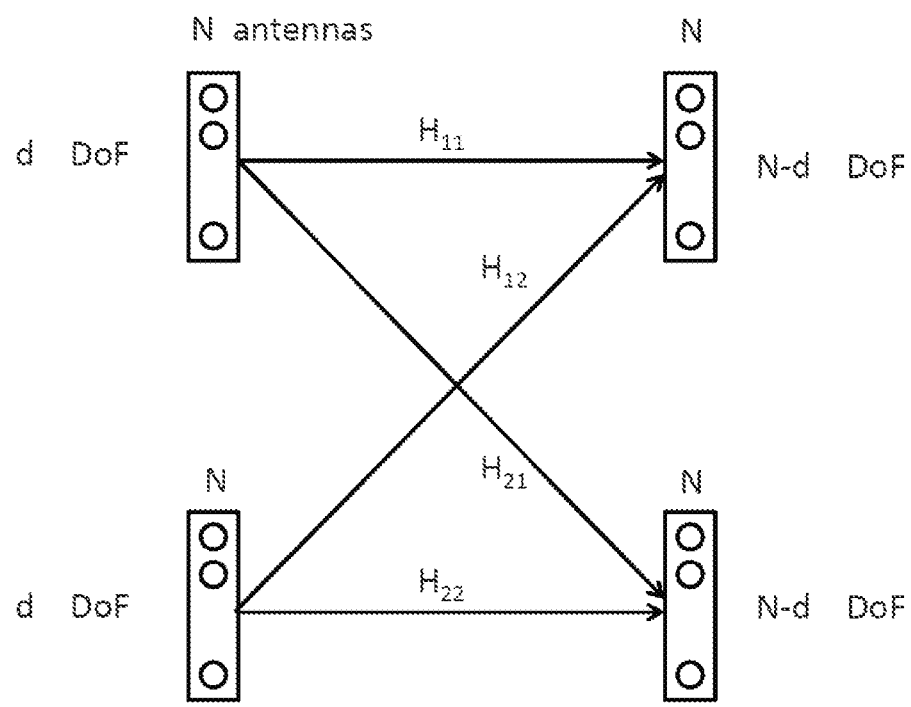
FIG. 4 is a schematic of one embodiment of the degrees of freedom in a symmetric full bipartite interference channel (FBIC), in accordance with the present disclosure.

In the following paragraphs some examples of designs and bound for interference alignment in FBIC type channels is provided. For example (referred to hereafter as Lemma 1), the maximum degrees of freedom in a (2,2) FPIC channel with N antenna, e.g., virtual antenna, at each node, e.g., transmission and receiving nodes, may be equal to 2N, as depicted in FIG. 4. FIG. 4 depicts one embodiment of the degrees of freedom available in a symmetric (2,2) FBIC. In this example, $V_1$ and $V_2$ can be the transmit precoding filters (as depicted in FIG. 3) and $U_1$ and $U_2$ can be the receive precoding filters (as depicted in FIG. 3). The following equation is to be satisfied:

$$U_i H_{ij} V_j = 0 \quad \forall i=1,2, \text{ and } j=1,2 \quad \text{Equation (8)}$$

Letting $d_{t,i}$ and $d_{r,i}$, i=1, 2 denote the degrees of freedom of transmitting notes and receiving nodes, respectively. Counting, the number of variables and equations, results in the following:

$$\Sigma_{i=1}^2 d_{t,i}(N - d_{t,i}) + d_{r,i}(N - Nd_{r,i}) \geq \Sigma_{i=1}^2 \Sigma_{i=1}^2 d_{t,i} d_{r,j} \quad \text{Equation (9)}$$

Rearranging the above inequality in Equation (9) provides the following:

$$(d_{t,1}+d_{t,2}+d_{r,1}+d_{r,2})N \geq \Sigma_{i=1}^{2}d_{t,i}^{2}+\Sigma_{i=1}^{2}d_{r,i}^{2}+\Sigma_{i=1}^{2}\Sigma_{i=1}^{2}d_{t,i}d_{r,j} \quad \text{Equation (10)}$$

$$\geq \Sigma_{i=1}^{2}d_{t,i}^{2}+\Sigma_{i=1}^{2}d_{r,i}^{2}+\Sigma_{i=1}^{2}\Sigma_{i=1}^{2}d_{t,i}d_{r,j}-(d_{t,1}-d_{t,2})^{2}-(d_{r,1}-d_{r,2})^{2} \quad \text{Equation (11)}$$

$$\geq \tfrac{1}{2}(d_{t,1}+d_{t,2}+d_{r,1}+d_{r,2})^{2} \quad \text{Equation (12)}$$

Hence providing:

$$(d_{t,1}+d_{t,2}+d_{r,1}+d_{r,2}) \leq 2N \quad \text{Equation (13)}$$

In another example (referred to as Lemma 2 and reduction lemma), if by using a particular set of transmit and receive filters, a set of degrees of freedom is achievable, it can be possible to rewrite all the channels with a different number of transmit and receive antennas that are equal to the achievable degrees of freedoms at each node where the channel gain between the pair of the nodes (where interference has been taken care of) is equal to zero. For example, making the assumption that the transmit precoders $V_i$, i=1, 2, . . . , L and the receive filters Uj, j=1, 2, . . . , K have been used at uplink and downlink nodes. The signal seen at the receiver j can be rewritten as $y'_j = U_j y_j$ and the transmit signal at the transmitting node i is given by $x_i = v_j x'_i$. In view of the above, the following is provided:

$$y_j = \Sigma_{i=1}^{L} H_{ji} x_i + z_j \quad \text{Equation (14)}$$

$$y'_j = \Sigma_{i=1}^{L} U_j H_{ji} V_i x'_i + z'_j, \quad \text{Equation (15)}$$

where $z'_j = U_j z_j$. Therefore, the equivalent channel can be considered as $H'_{ji} = U_j H_{ji} V_i$ that is the matrix of size $d_{r,j} \times d_{t,i}$. In some embodiments, the selection of transmit precoders and receive filters may only cancels out the interferences between particular subgroups of the nodes where $U_j H_{ji} V_i$ is zero only for particular values of i and j for which the corresponding channels are zero. In some embodiments, the reduction lemma allows for a full interference alignment solution for a complicated problem to be broken down in multiple stages. For example, in some embodiments, by using the reduction lemma it is possible to find simple algebraic solution to the interference alignment problem in large channels.

In another example (referred to as Lemma 3), a total degrees of freedom being equal to 2N is achievable using any split of d, d≤N at both transmit points, and N−d at both receiving nodes in a (2,2) FBIC channel, as depicted in FIG. 4, with N antenna at each node. As in proof of Lemma 1, $V_1$ and $V_2$ can be the transmit precoding filters of size N×d and $U_1$ and $U_2$ can be the receive precoding filters of size N×(N−d). The following has to be satisfied:

$$U_i H_{ij} V_j = 0 \quad \forall i=1,2, \text{ and } j=1,2 \quad \text{Equation (16)}$$

$V_1$ and $V_2$ are selected such that span($H_{11}V_1$)=span($H_{12}V_2$) in order to align the interferences of both transmitting nodes into the same space of size N×d dimensions at the receiving node 1. Such selection is easy as for any choice of the precoding matrix $V_1$, the precoding matrix $V_2$ can be obtained by choosing $V_2 = H_{12}^{-1} H_{11} V_1$ where for random matrices Hi j this can be done with probability 1. In order to align the interferences of both transmitter to the receiving node 2, we must have span($H_{21}V_1$)=span($H_{22}V_2$), hence we have span($V_1$)=span($H_{11}^{-1} H_{12} V_2$). In order to satisfy both alignment conditions, we have span($V_1$)=span($H_{11}^{-1} H_{12} H_{12}^{-1} H_{11} V_1$). This means that $V_1$ can be composed of any d eigenvectors of the matrix $H_{11}^{-1} H_{12} H_{12}^{-1} H_{11}$ and $V_2 = H_{12}^{-1} H_{11} V_1$. Under these conditions the space of signals at both receiving nodes is limited to a d dimensions and hence there exist N−d orthogonal dimensions at each receiving nodes, which can be used to construct N×(N−d) dimensional receive filters $U_1$ and $U_2$.

In another example (referred to as Lemma 4), in a single cell with a full duplex access point with N transmit and N receive RF chains and (K−t,K) FBIC with L transmitting nodes with degrees of freedom $d_{t,i}$, i=1, . . . , L, and K receiving nodes with degrees of freedom $d_{r,i}$, i=1, . . . , K, the total simultaneous uplink and downlink streams is equal to:

$$\min(N, \Sigma_{i=1}^{L} d_{t,i}) + \min(N, (\Sigma_{i=1}^{K} d_{r,i})) \quad \text{Equation (17)}$$

Proof for the validity of Equation (17) relies on the fact that the transmitting nodes have total of $\Sigma_{i=1}^{L} d_{t,i}$ degrees of freedom to transmit in uplink to a full duplex access point without causing interference on total of $\Sigma_{i=1}^{K} d_{r,i}$ degrees on freedom available to the receiving point that receive signals from the same full duplex access point in the downlink. However, the number of transmitted stream in the downlink and received stream in the uplink by the access point can also be limited by the number of RF chain (or corresponding antenna) in each direction. Assuming the number of antennas for the purpose of transmission or reception or equivalently, the number of RF chain in the receive path and transmit path are both equal to N that is the same as the number of antennas for each node in FBIC, the total stream in the uplink and downlink is also bounded by N. The uplink channel between the transmitting node and the access point is independent of the intranode channels in FBIC, hence, the transmitted signal to the access point are received in generic direction, which means that up to the N of them are independent. In some embodiments, the number of antenna at the access point could be different from the number of antenna at the FBIC. For example, the number of access point antenna might be larger than the number of antennas at the transmitting point, and still due to the fact that the uplink channels are generic, the number of resolvable directions would be only limited by the number of antennas at the access point rather than the dimension of transmitting vectors. The same arguments hold true for the downlink channel between the access point and the receiving nodes.

Figure 6:
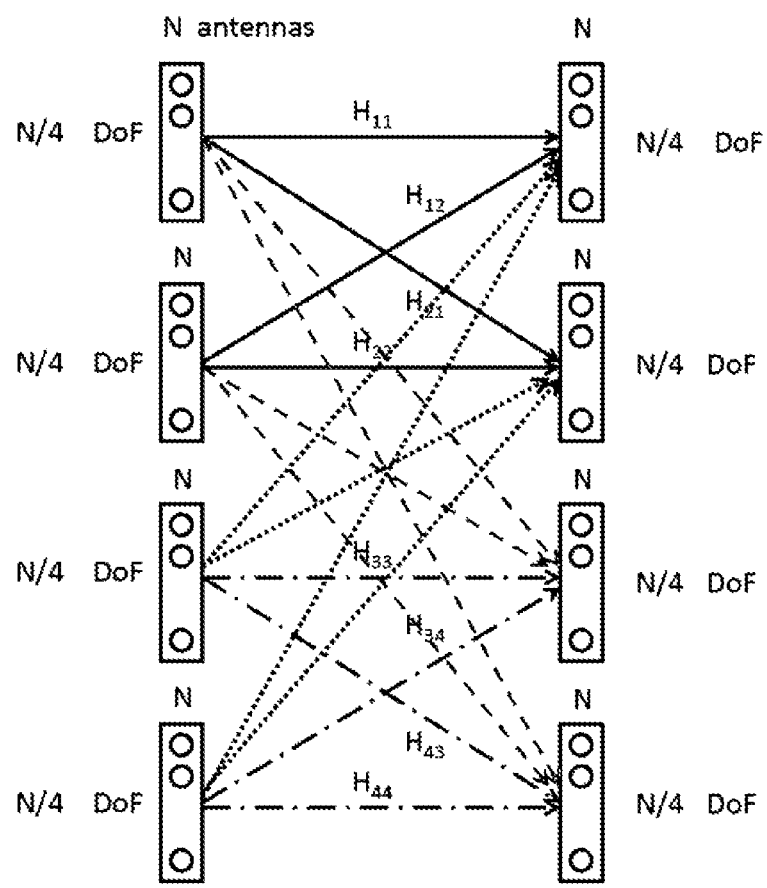
FIG. 6 is a schematic depicting degrees of freedom that are achievable in a symmetric (4,4) FBIC with algebraic construction (N=4 antennas per node).
Figure 7:
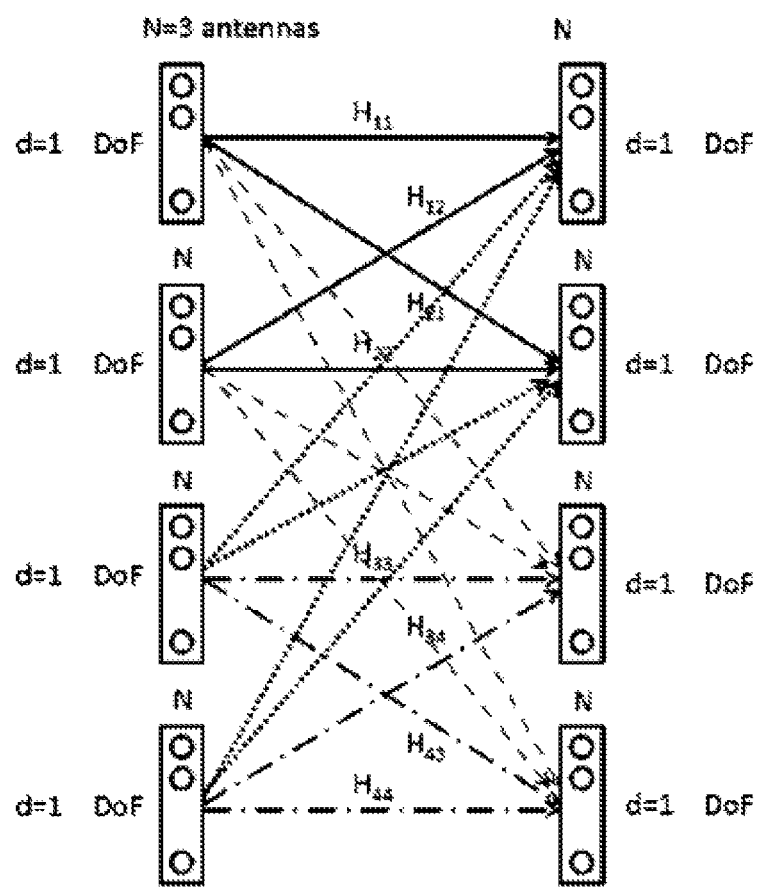
FIG. 7 is a schematic depicting the degrees of freedom that are achievable in a symmetric (4,4) FBIC with N=3 antennas per node.

FIG. 6 depicts the degrees of freedom that are achievable in a symmetric (4,4) FBIC with algebraic construction (N=4 antennas per node). FIG. 7 depicts the degrees of freedom that are achievable in a symmetric (4,4) FBIC with N=3 antennas per node.

Figure 8:
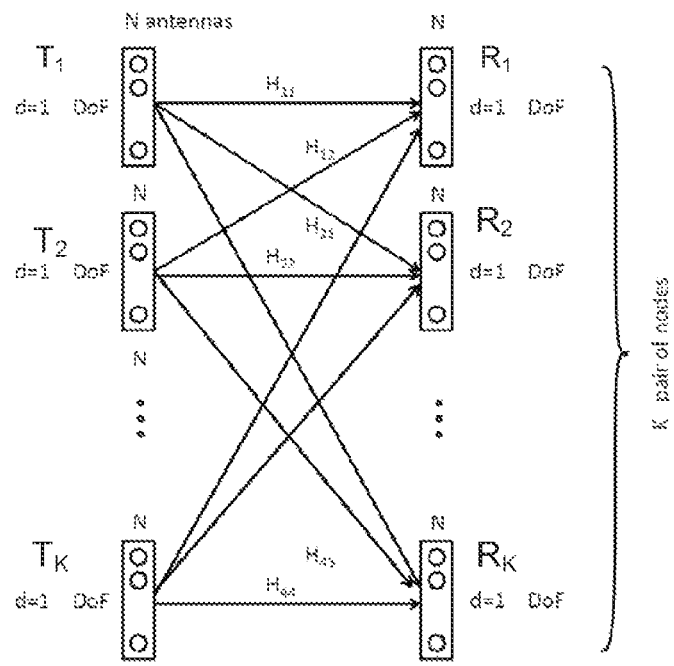
FIG. 8 is a schematic depicting the degrees of freedom achievable (by algebraic construction) in a symmetric (K,K) FBIC with arbitrary number of nodes K and number of antennas N per node.

In yet another example (referred to as Lemma 5), a maximum of the total degrees of freedom in a (K,K) FBIC channel, as depicted in FIG. 8, with a symmetric d degrees of freedom and N antenna at each node is $$2K \left\lfloor \frac{2N}{k+2} \right\rfloor.$$

FIG. 8 depicts the degrees of freedom achievable (by algebraic construction) in a symmetric (K,K) FBIC with arbitrary number of nodes K and number of antennas N per node. In this example, the number of variables have to be greater or equal to the number of constraint in order to have a possible solution, in which:

$$\Sigma_{i=1}^{K} d_{t,i}(N-d_{t,i}) + d_{r,i}(N-d_{r,1}) \geq \Sigma_{i=1}^{K} \Sigma_{i=1}^{K} d_{t,i} d_{r,j} \quad \text{Equation (18)}$$

$$2Kd(n-d) \geq K^2 d^2 \quad \text{Equation (19)}$$

$$d \leq \frac{2N}{K+2} \quad \text{Equation (20)}$$

In this example, there are 2K nodes each with degrees of freedom less than or equal to $$\frac{2N}{k+2}$$

that will add up to $$2K\left\lfloor \frac{2N}{K+2} \right\rfloor.$$

In a further example (referred to as Lemma 6), the maximum degrees of freedom in an arbitrarily large FBIC with maximum of N antenna at each node is not limited by N and can be made arbitrarily large. Considering a (K,K) FBIC where the case that total uplink degrees of freedom is limited to N−1, i.e.:

$$\sum_{i=1}^{K} d_{t,1} \leq N-1 \quad \text{Equation (21)}$$

In this example, each node in the downlink has at least one degrees of freedom left. Hence, the total number of degrees of freedom in the system can be made at least as large as N−1+K. Therefore, in some embodiments, by increasing the number of downlink users, e.g., increasing K, the total degrees of freedom in the system can grow unboundedly and independent of the number antennas N. In some embodiments of this example, the total number of uplink user does not need to increase with increasing K, and at most N−1 uplink user suffices to reach the desired result. Lemma 6 reveals that the (K,K) FBIC with constant gain has degrees of freedom scaling that is much better than interference channel even with time extension (time varying channel with channel state information (CSI) at the transmitters) that is bounded by K/2.

In a further example (referred to as Lemma 7), an FBIC is considered with N antenna per node, wherein if either of the uplink or downlink degrees of freedom scales with the number of antennas N as $(1+\alpha)N$ then the other one cannot scale with a scaling factor more than $(1+1/\alpha)$. In some examples, this can mean that both the uplink and downlink degrees of freedom cannot be made equal to 2N or larger simultaneously. For example, considering a (K,K) FBIC with N antenna at each node, in which by counting the number of variables and constraints, the following equations are provided:

$$\sum_{i=1}^{K} d_{t,i}(N-d_{t,i})+d_{r,i}(N-d_{r,i}) \geq \sum_{i=1}^{K}\sum_{j=1}^{K} d_{t,i}d_{r,j} \quad \text{Equation (22)}$$

$$N(\sum_{i=1}^{K} d_{t,i}+\sum_{i=1}^{K} d_{r,1}) \geq \sum_{i=1}^{K} d_{t,i}^{2}+\sum_{i=1}^{K} d_{r,i}^{2}+\sum_{i=1}^{K} d_{t,i}\sum_{i=1}^{K} d_{r,j}^{2} \quad \text{Equation (23)}$$

In one example, when $(1+\alpha)N=\sum_{i=1}^{K} d_{t,i}$ and $(1+\beta)N=\sum_{i=1}^{K} d_{r,i}$ for some non negative real numbers $\alpha$ and $\beta$, Lemma 9 can support the existence of at least N uplink and N downlink simultaneously. $\alpha$ and $\beta$ may exist. However, for the purpose of finding the upper bound, $\alpha$ and $\beta$ may be considered as negative values between −1 and 0 to provide:

$$N((1+\alpha)N+(1+\beta)N) \geq \sum_{i=1}^{K} d_{t,i}^{2}+\sum_{i=1}^{K} d_{r,i}^{2}+(1+\alpha)N(1+\beta)N \quad \text{Equation (24)}$$

$$N^{2}(2+\alpha+\beta) \geq \sum_{i=1}^{K} d_{t,i}^{2}+\sum_{i=1}^{K} d_{r,i}^{2}+N^{2}(1+\alpha+\alpha\beta) \quad \text{Equation (25)}$$

$$N^{2} \geq \sum_{i=1}^{K} d_{t,i}^{2}+\sum_{i=1}^{K} d_{r,i}^{2}+N^{2}\alpha\beta \quad \text{Equation (26)}$$

Therefore, in view of the above, $\alpha\beta<1$ or equivalently $\beta<1/\alpha$, must be met. This can mean that scaling in the uplink and downlink are bounded by $(1-\alpha)N$ and $(1+\beta)N$ where $$\beta < \frac{1}{\alpha}.$$

Hence, the scaling of 2N in the uplink and downlink is possible simultaneously. Further, based on Theorem 1 for large enough K it is possible to approach arbitrarily close to this scaling.

Figure 15:
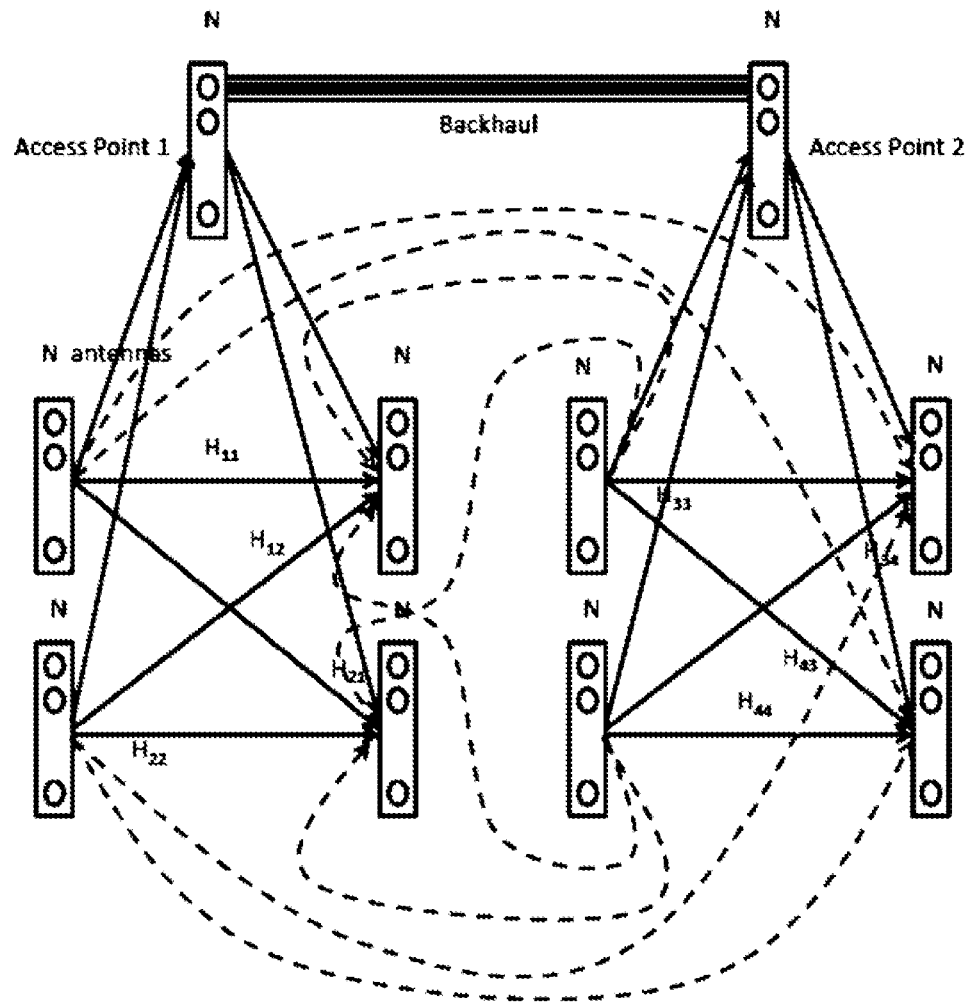
FIG. 15 is a schematic of a multi-cell channel having FBIC between users in each cell, and showing the interference from adjacent cells, in accordance with one embodiment of the present disclosure.

FIG. 15 depicts an example of a multi-cell channel having FBIC between the users in each cell, and showing the interference from other (adjacent) cells. FIG. 15 illustrates the uplink and downlink channel in each cell between the users and the access points. FIG. 15 shows the backhaul connection between the access points. In an yet another example (referred to as Lemma 8), the total degrees of freedom is equal to N(M+1)−1 in a M cell full duplex system, as depicted in FIG. 15, in which a maximum of N antennas per node and access point is achievable. This corresponds to the gain of $$1 + \frac{N-1}{M}$$

for using full duplex versus half duplex access points. Furthermore, in some embodiments, no scaling better than 1/(M−1) with respect to the number of cells is achievable; which means that the presented scheme is optimal in terms of scaling. Using the construction presented in Lemma 6 it is possible to have a (K,K) FBIC with N antenna per node that has total of N−1 degrees of freedom in the uplink and K degrees of freedom in the downlink. In some examples, by choosing K=MN, and dividing the receiving nodes into M equal group of size N node each, and assigning each group to a different access point total of MN degrees of freedom in the downlink is available (based on Lemma 4).

On the other hand, any split of the nodes in the uplink would result in total of N−1 degrees of freedom in the uplink simultaneously with MN degrees of freedom in the downlink. Hence, the total degrees of freedom is equal to N(M+1)−1. Splitting the streams in the downlink into M different cells requires implementation of cooperative multi-point transmission (also known as CoMP) in the downlink. Based on reciprocity for any configuration, the role of the transmit and receiving nodes in FBIC can be reversed without affecting the achievable degrees of freedom. Therefore, it is also possible to achieve total of MN degrees of freedom in the uplink and N−1 degrees of freedom in the downlink. In this scenario, the requirement of downlink-CoMP will be replaced with cooperative multi point reception or uplink-CoMP.

Comparing the full duplex access point with a half duplex access point, we can achieve a total of MN+N−1 degrees of freedom with full duplex access point versus the maximum of MN degrees of freedom with half duplex access point. Hence the gain of using full duplex versus half duplex access point $$G\frac{FD}{HD} \text{ is } 1 + \frac{N-1}{NM}$$

which means that by increasing the number of access points $$G\frac{FD}{HD}$$

only scales with $$\frac{1}{M}.$$

Proceeding to characterizing the bound on the achievable scaling of $$G\frac{FD}{HD}$$

by increasing the number of access point M, by using Lemma 7, the achievable scaling of the total degrees of freedom in the uplink and downlink are bounded by $(1+\alpha)N$ and $(1+\beta)N$ where $\beta<1/\alpha$. In order to use the full degrees of freedom in, for example, uplink, we can set $(1+\alpha)N=MN$, and hence the total degrees of freedom in the downlink is limited to $$\left(1+\frac{1}{m-1}\right)N.$$

Using proper splitting of the transmit and receiving nodes of FBIC into M cells it can be possible to achieve a total of $MN+N+N/(M-1)$ streams. Therefore, the following equation is provided:

$$G_{\frac{FD}{HD}} = \frac{MN+N+\frac{N}{M-1}}{MN} = 1+\frac{1}{M-1} \qquad \text{Equation (27)}$$

The upper bound on the scaling of $$G_{\frac{FD}{HD}}$$

as a function M is 1/M.

In another example (referred to as Lemma 9), for any (K,K) FBIC channel with N=K antennas per node (e.g, as in FIG. 8), there may exist an algebraic construction of the transmit and receive vector that achieves degree of freedom 1 per node, e.g., see FIG. 7 in which K=4. For example, the case of (2,2) has been handled in Lemma 3. In this example, the case of K=2k is considered, for k=2, 3, . . . etc. Referring to FIG. 8, the transmit nodes are labeled by T1, T2, . . . , TK and receiving nodes are labeled by R1, R2, . . . , RK.

In this example, the transmit and receiving nodes are divided into groups of two where the $g^{th}$ group, g=1, 2, . . . , k, consists of the transmitting nodes $T_{2g-1}$ and $T_{2g}$ and the receiving nodes $R_{2g-1}$ and $R_{2g}$. The methodology described above in Lemma 3 may be used to transmit in a single dimension from each transmitter and align the received interferences into a single dimension for each pair, leaving the receiving nodes with K-1 degrees of freedom.

The total number of transmitters besides the transmitters in a given group is equal to K-2, hence, their received interference at this group cannot span more than K-2 dimensions. Therefore, each receiver will have K-1-(K-2)=1 degrees of freedom. Letting K=2k-1, for k=2, 3, . . . the transmit and receiving nodes can be divided into groups of two except for the last group where the $g^{th}$ group, g=1, 2, . . . , k-1, consists of the transmitting nodes $T_{2g-1}$ and $T_{2g}$ and the receiving nodes $R_{2g-1}$ and $R_{2g}$ and the last group consists of a single transmitting node $T_{2k-1}$ and a single receiving node $R_{2k-1}$.

The methodology of Lemma 3 can be used to transmit in a single dimension from each transmitter and align the received interferences into a single dimension for each pair g=1, 2, . . . , k-1, leaving the receiving nodes with K-1 degrees of freedom. The receiving node $R_{2-1}$ will see interference from the first K-1 transmitters in an at most K-1 dimensional space. Hence, this receiver is left with at least one degrees of freedom and chooses its receive filter, accordingly. In some examples, it can be important to make sure that the transmitter $T_{2k-1}$ does not interfere with the receiver $R_{2-1}$ in this direction, hence, the transmitter $T_{2k-1}$ can choose its transmit directions in only K-1 dimension beside the dimension that after passing through the channel will cause interference with $R_{2-1}$ in its only dimension.

The total number of transmitters besides the transmitters in a given group g=1, 2, . . . , k-1 and the last transmitter $T_{2k-1}$ is equal to K-3, hence, their received interference at this group g=1, 2, . . . , k-1 cannot span more than K-3 dimensions. Hence, each receiver g=1, 2, . . . , k-1 is left with K-1-(K-3)=2 degrees of freedom. The only interferences that have not been accounted for are from the last transmitter $T_{2k-1}$ to all the receivers of the group g=1, 2, . . . , k-1. Using reciprocity, it is easier to exchange the role of the receivers $R_g$, g=1, 2, . . . , 2k and the transmitter $T_{2k-1}$ and their effective channels that is obtained after performing the reduction of Lemma 2. It can be easily deducted that each pair $R_{2g}$ and $R_{2g}-1$, g=1, 2, . . . , k can align their interferences at $T_{2k-1}$ in the same direction. Hence total of k degrees of freedom will be deducted from the last node $T_{2k-1}$ leaving this node with K-k-1=k≥1 degrees of freedom. A simpler argument may also be made. Let all receiving nodes $R_g$, g=3, 4, . . . , K only select one degree of freedom. Then, the node TK will have K-(K-2)=2 degrees of freedom and the only interferences that have not been accounted for are from the pair R1 and R2 to TK where each node has two degrees of freedom. Using the reduction in Lemma 2 it is easily observed that the interferences in the reciprocal channel from the pair R1 and R2 to the node TK can be aligned and this process will take away only one degree of freedom from each involved node leaving these three nodes with one degree of freedom.

The following paragraph provides the details of theorem 1 that has been referenced in the above examples, i.e., Lemmas. In the following theorem, let $N_{t,i}$=1: L and $N_{r,i}$, i=1. K denotes the number of antennas at the L transmitting nodes and K receiving nodes, respectively. The total degrees of freedom $\Sigma_{i=1}^{L} d_{t,i}$ in the uplink and $\Sigma_{i=1}^{K} dr, i$ in the downlink is achievable where $d_{t,i}$ and $d_{r,i}$ denote the degrees of freedom of the $i^{th}$ node in the uplink and downlink, respectively, if and only if the following conditions are satisfied:

$$\Sigma_{i:(i,j)\in I} d_{t,i}(N_{t,i}-d_{t,i})+\Sigma_{j:(i,j)\in I} d_{r,i}$$
$$(N_{r,i}-d_{r,i})\geq\Sigma_{i,j:(i,j)\in I} d_{t,i}d_{r,j} \qquad \text{Equation (28)}$$

$$I\subseteq \mathcal{M}=\{(i,j),1\leq i\leq L,1\leq j\leq K\} \qquad \text{Equation (29)}$$

$d_{t,i} \leq N_{t,i}$, and $d_{r,i} \leq N_{r,i}$      Equation (30)

$d_{t,i} + d_{r,j} \leq \max N_{t,i} N_{r,j}$      Equation (31)

Figure 9:
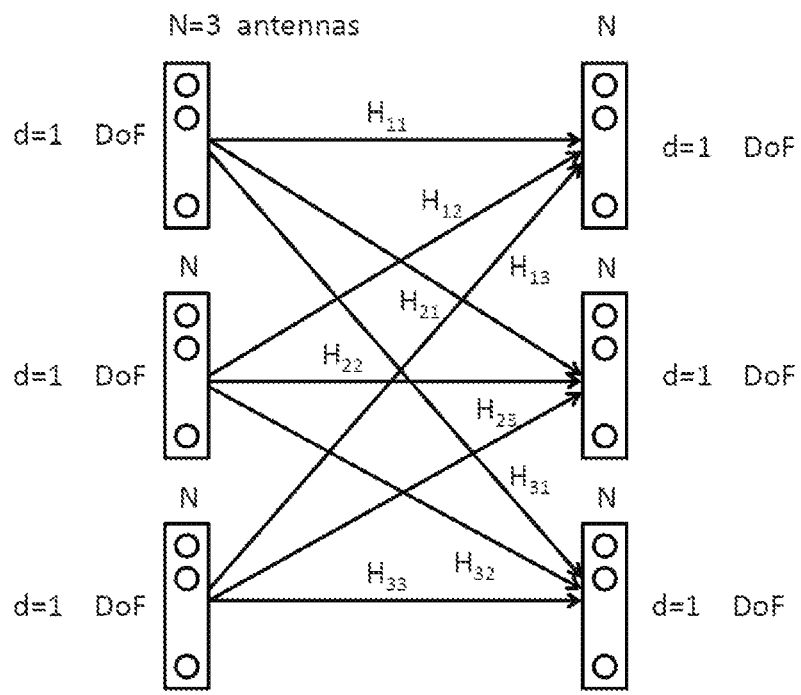
FIG. 9 is a schematic depicting the degrees of freedom achievable in a symmetric (3,3) FBIC with algebraic construction with N=3 antennas per node.
Figure 10:
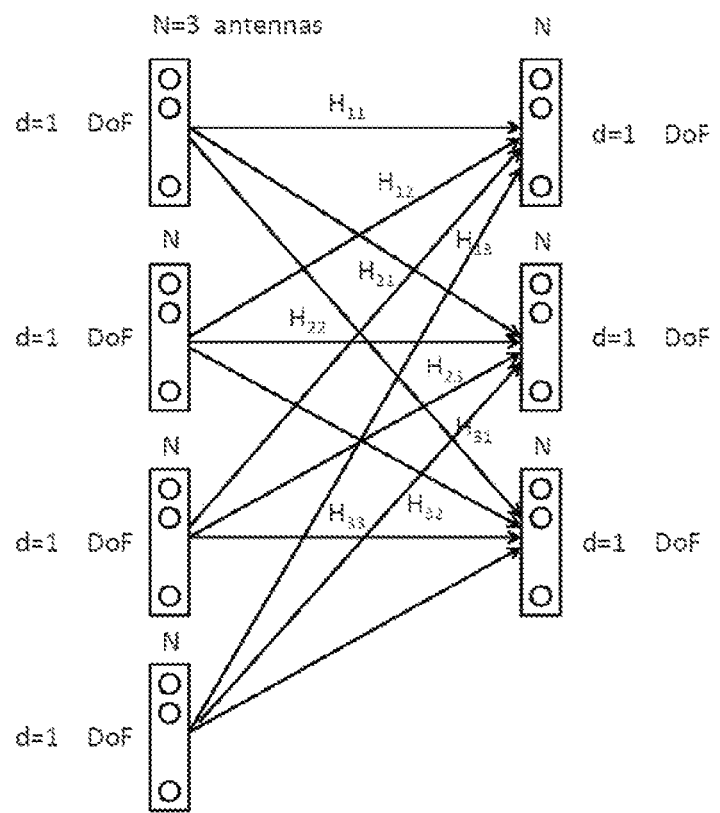
FIG. 10 is a schematic depicting the degrees of freedom achievable in an asymmetric (4,3) FBIC (or equivalently in (3,4) FBIC) with algebraic construction (N=3 antennas per node).
Figure 11:
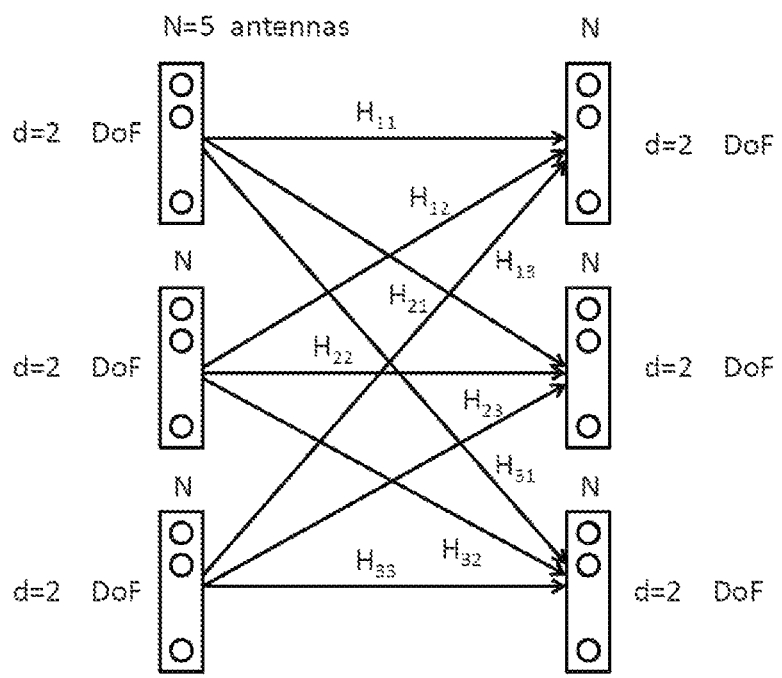
FIG. 11 is a schematic depicting the degrees of freedom available in a symmetric (3,3) FBIC with N=5 antennas per node.
Figure 12:
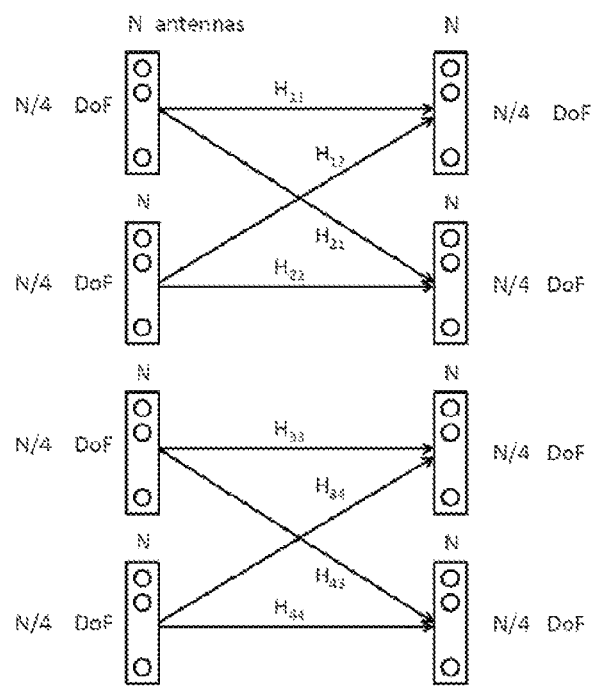
FIG. 12 is a schematic depicting one embodiment of an FBIC using modular construction including an intermediate step K pair of nodes in K/2 pairs.

FIG. 9 depicts the degrees of freedom achievable in a symmetric (3,3) FBIC with algebraic construction with N=3 antennas per node. FIG. 10 depicts the degrees of freedom achievable in an asymmetric (4,3) FBIC (or equivalently in (3,4) FBIC) with algebraic construction (N=3 antennas per node). FIG. 11 depicts the degrees of freedom available in a symmetric (3,3) FBIC with N=5 antennas per node. FIG. 12 depicts one embodiment of an FBIC using modular construction. In this example, an intermediate step K pair of nodes in K/2 pairs (e.g., K=4).

The methods, systems and computer program products disclosed herein provide interference alignment in a new channel in the form of full bipartite interference channel (FBIC) where each receiving node sees an interfering signal from all transmitting nodes. The FBIC channel is a part of the single cell channel (SCC) where the SCC is obtained by addition of a single node (access point) to the FBIC and considering the broadcast channel or the downlink channels from the access point to all receiving points in FBIC and the multiple access channel or the uplink channel from all the transmitting points in FBIC to the access point.

In some embodiments, it is considered that uplink CoMP might be harder to realize than the downlink CoMP. Therefore, in some examples, it might be desirable not to two adjacent cells to receive in uplink. For example, consider a network of three cells with half duplex access point having N antenna each. In such situation, either all three cells are in downlink mode simultaneously or at most one access point is in uplink mode while the other access points are in uplink mode. However, if the access points are full duplex capable, it is enough to have one access point to work in FD mode to receive N-1 in the uplink and transmit N streams in the downlink while the other two access point remain in the half duplex mode and each transmit N streams in the downlink. It is noted that it is also possible to change the role of uplink and downlink, i.e., one access point transmit N-1 streams in downlink while receiving N streams in the uplink in full duplex mode while the other two access points work in half-duplex mode and each receive N streams in the uplink. In some examples, a total 4N-1 streams are possible due to methods described in Lemma 8. In other embodiments, by using all three access points in full duplex mode, it is possible to have different number of uplink streams in the former case or downlink streams in the latter case that add up to N-1.

Figure 13:
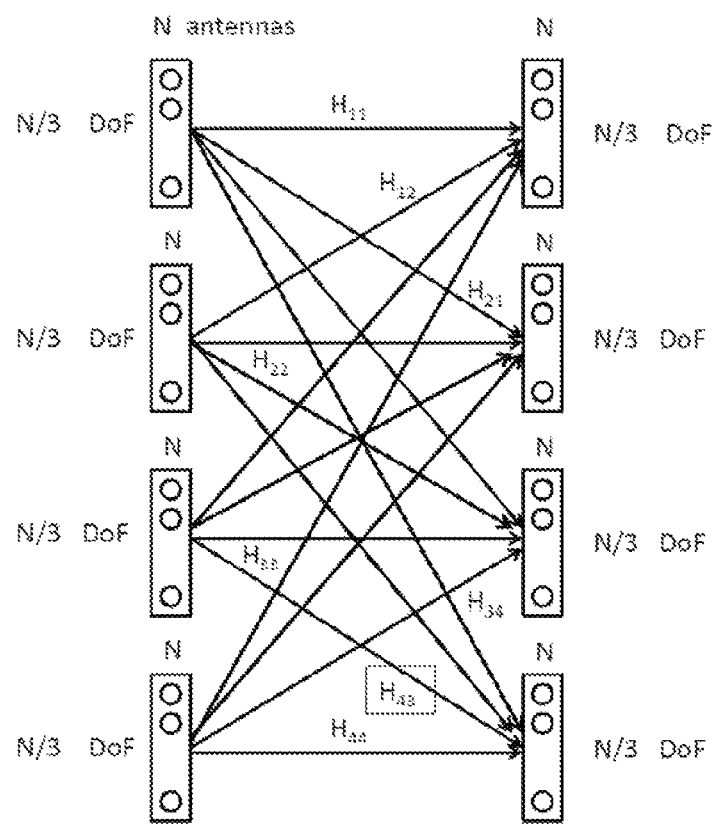
FIG. 13 is a schematic depicting the degrees of freedom available in a symmetric (4,4) FBIC with N antennas per node.

Although Lemma 8 characterizes the achievable degrees of freedom and the scaling of $$G\frac{FD}{HD},$$

the actual number of nodes in each cell to achieve this gain can drastically change by using different configurations. To this end, we note that only four nodes are enough to achieve total degree of freedom 2N in a single cell while the construction of the lemma requires at least N users where N is the number of antenna per node. We also note that the factor of 3N/2 can be achieved in two cells by using the construction of Lemma 8. However, the actual bound for possible degrees of freedom in two cells is given by 2N as predicted by the same lemma, although the actual value of 2N is not achievable for any finite N but the bound is 2N which means that for large enough N we can get as close as we want to 2N degrees of freedom. For example, if only two cell is deployed and four nodes per cell are used where each node has N antenna the total degrees of freedom is equal to 8N/6, as depicted in FIG. 13, which corresponds to the gain of 33% in total aggregate downlink and uplink throughput. FIG. 13 depicts the degrees of freedom available in a symmetric (4,4) FBIC with N antennas per node.

Figure 14:
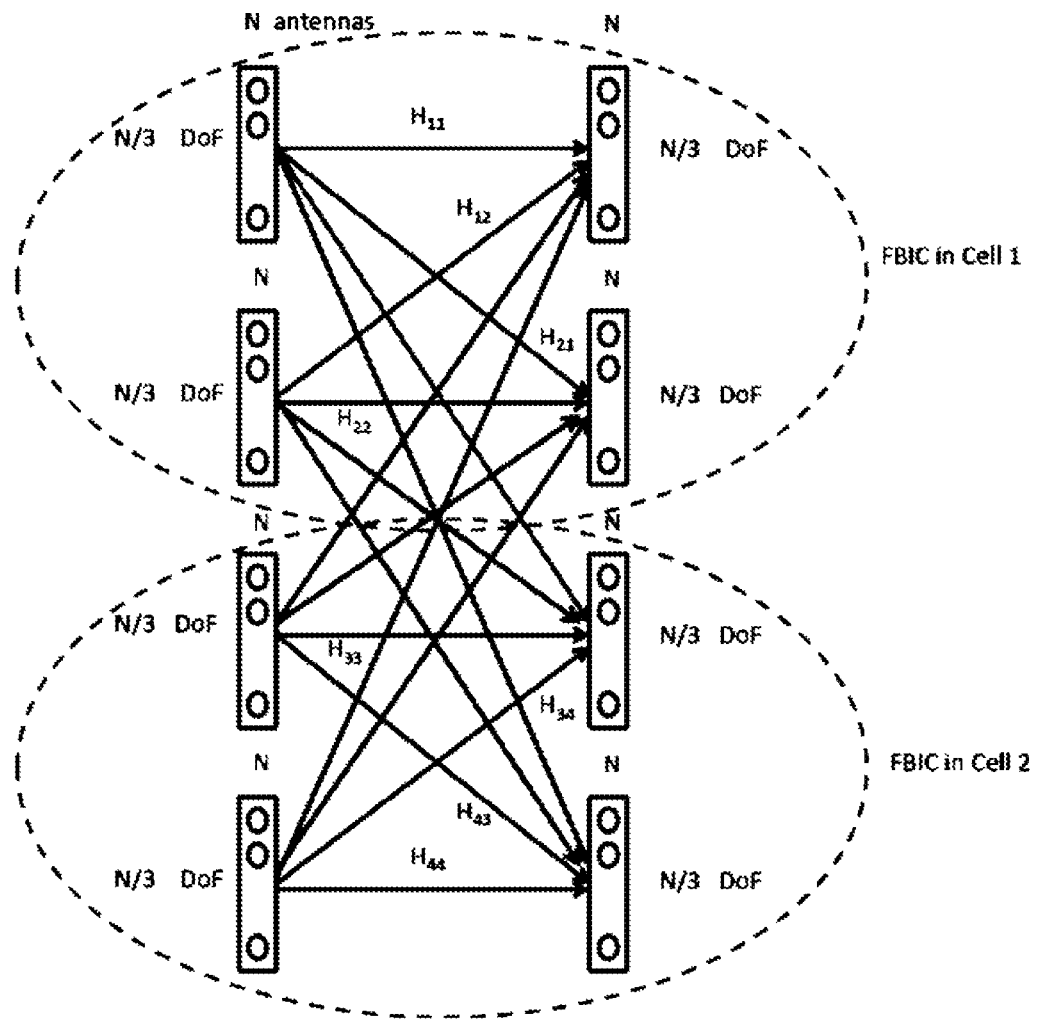
FIG. 14 is a schematic of two cells including full bipartite interference channel (FBIC) interference configurations, in accordance with one embodiment of the present disclosure.

FIG. 14 depicts one embodiment of breaking a single FBIC into several FBIC (not necessarily symmetric with possibly different uplink or downlink nodes). FIG. 14 depicts one embodiment of the symmetric breaking of 8 nodes into two FBIC with 4 nodes each with inter-cell and intra-cell interferences.

One result of the methods, systems and computer products disclosed herein is a very optimistic view for the use of full duplex in cellular systems by analytically proving that the gain of using full duplex access point versus using half duplex access point is (1) full 100% in a single cell (2) considerably maintained over multiple cells having 50%, 33%, and 25% for two, three and four cells by algebraic construction, respectively. The actual bound of the gain of using full duplex versus half duplex access points can be in fact 100%, 50%, and 33% for two, three, and four cells, respectively, and this bound can be achieved through solving optimization problem to find out the precoding matrices. Considering the results on local information exchange and sufficiency of doing interference alignment locally, there are usually between three to four base station in each interfering zone and the throughput increase might remain in upper 30% range.

In another aspect of the present disclosure, a full duplex system without strings is provided to enable full duplex with half duplex clients. Enabling wireless full-duplex (from an AP) with multiple half-duplex (HD) clients is key to widespread adoption of full-duplex (FD) in commercial networks. However, enabling FD in such networks is fundamentally challenged by a new form of uplink-downlink interference (UDI), arising between HD clients operating simultaneously in the uplink and downlink directions of FD. In this context, the present disclosure shows that spatial interference alignment (IA) between clients is an effective and scalable technique to address UDI and hence enable FD in these networks, especially in the presence of MIMO. The present disclosure also provides a solution and system in the form of FDoS: Full-Duplex without Strings that incorporates this notion.

In one embodiment, FDoS shows that four HD clients can be both necessary and sufficient to eliminate UDI through IA and enable 2N streams at an N transceiver AP. FDoS may also include an efficient MAC design at the AP to handle clients with heterogeneous antenna capabilities, maximize the throughput of the enabled streams in the FD session, as well as reduce the overhead incurred in FDoS, e.g., by half, by facilitating a distributed implementation.

Wireless full-duplex (FD) allows a device to transmit and receive at the same time in the same frequency band, thereby potentially doubling the link capacity. However, to allow for widespread adoption of FD, it can be important to enable FD in commercial networks. In such networks, while the AP can be envisioned to be burdened with additional processing for FD, it is hard to embed FD functionality in client devices that are energy constrained to begin with. Hence, in some embodiments, the key to widespread adoption of FD lies in enabling it with half-duplex (HD) clients. Enabling FD with half-duplex clients requires at least two clients—one for transmitting to the AP, while the other for receiving from the AP simultaneously. However, this introduces a new form of interference between the uplink and downlink clients of the FD session, which may be referred to as the uplink-downlink interference (UDI, also called inter-node interference).

Figure 16A:
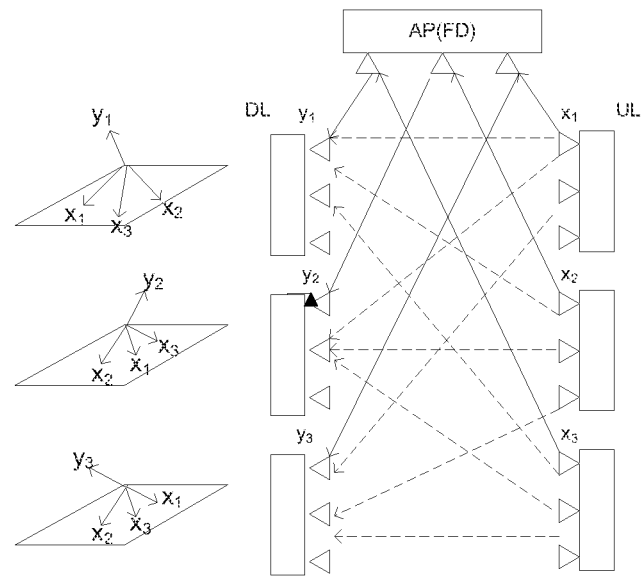
FIG. 16A is a schematic of interference alignment to address uplink-downlink interference (UDI) in a full duplex (FD) wireless network, in accordance with one embodiment of the present disclosure.
Figure 16B:
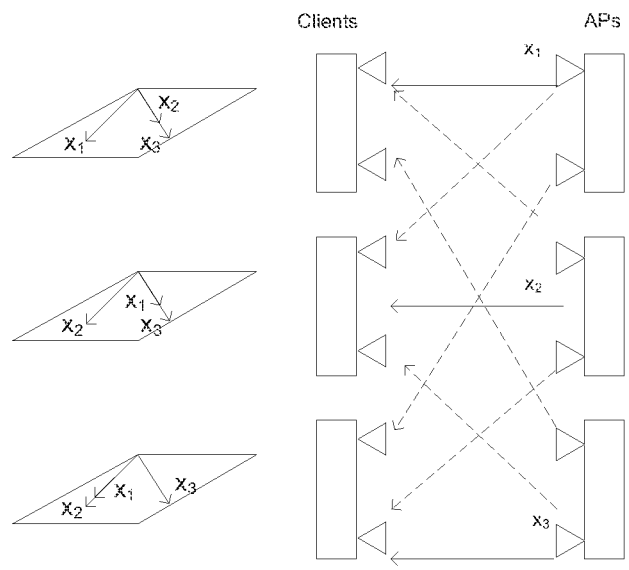
FIG. 16B is a schematic of interface alignment in a half duplex (HD) wireless network, in accordance with the present disclosure.

Towards this challenge of overcoming UDI interference, one of contributions of the methods, systems and computer program products disclosed herein is showing that spatial interference alignment is a practical and effective approach to addressing the UDI problem in full-duplex both efficiently and scalably. In other words, with multiple antennas being available at the HD clients, uplink (UL) clients can align their transmissions (interference) towards the downlink (DL) clients in a FD session to eliminate the UDI, as shown in FIGS. 16A and 16B, which depict spatial interference alignment. FIG. 16A depicts interference alignment to address UDI in full duplex (FD) systems. FIG. 16B is an interference alignment illustration with a half duplex (HD) client.

To put the proposal of the present disclosure into perspective, note that for N transceiver AP and client (half-duplex) devices, while conventional FD systems enable 2N streams only in restricted settings (where UL and DL clients do not interfere or employ side channels) and interference alignment solutions (for HD systems) are limited to N streams, employing spatial interference alignment intelligently with full-duplex will enable 2N streams without any restriction on the client topologies or use of side channels, thereby truly enabling full-duplex in realistic network settings. The FDoS—Full Duplex without Strings system disclosed herein incorporates this notion. Several challenges arise in translating this notion into reality.

Specifically, although carried out in the same bandwidth, spatial interference alignment (IA) requires the estimation of channels between the UL and DL clients. This is an overhead specific to FDoS and scales with the number of DL and UL clients involved in the IA process during the FD session. In some embodiments, one key result here is in showing that irrespective of the number of antennas at the AP and clients (say N), exactly four clients—two in the DL and two in the UL, are necessary and sufficient to enable 2N streams with FD in any topology. This is an interesting result in that the additional overhead from IA is fixed (constant), restricted to four additional channel estimations and does not depend on N.

While the analytical results indicate the existence of a solution, constructing a feasible solution is a hard problem in itself. As will be discussed below, the present disclosure provides a low-complexity construction in FDoS, that proposes the notion of an interference alignment network and leverages its structure to generate a feasible IA solution supporting 2N streams for any given topology. The FDoS disclosed herein can incorporates a media access control (MAC) design at the AP that helps maximize the aggregate throughput from the FD session. The role of the MAC can two-fold: (i) compute the IA solution and MIMO precoders at the clients and AP in an efficient manner to not only handle the UDI problem and enable 2N streams but to also maximize the throughput of those enabled streams, and (ii) handle clients with heterogeneous antenna capabilities ($1 \leq M \leq N$) by determining when FD must be enabled and how FDoS must be adapted.

The methods, systems and computer program products disclosed herein leverage spatial interference alignment (IA) in distributed FD networks towards addressing the UDI problem. Specifically, with multiple antennas being available at clients, half-duplex UL clients will use their spatial dimensions effectively to align their interference (i.e. transmissions to full-duplex AP) towards the half-duplex DL clients in a FD session as shown in FIGS. 16A, 16B. Using the channel state information (CSI) between the UL and DL clients, appropriate precoders at the UL clients and receive filters at DL clients are employed. This eliminates the UDI, and hence enable N streams each on both the DL and UL simultaneously (for N antenna devices), thereby securing the multiplexing gain of two from FD. Such an approach has all the desired attributes of a good solution. (1) Efficient: It operates in the same bandwidth and does not depend on the separation between the UL and DL clients as UDI is addressed explicitly. (2) Scalable: It can secure the desired multiplexing gain from FD even in the presence of MIMO (i.e. multiple antenna devices) and multiple clients being involved in the FD session. (3) Deployable: IA, being a form of precoding, is only as challenging as multi-user MIMO systems and can be realized in practice with the AP serving as the FD session coordinator.

Figure 17A:
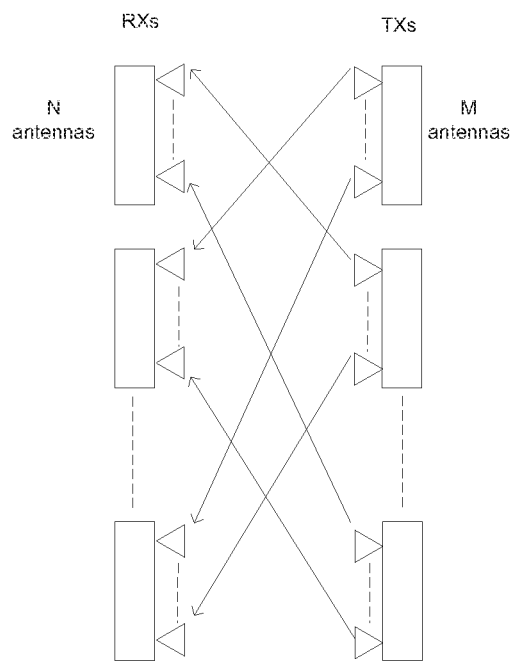
FIG. 17A is a schematic depicting a half duplex (HD) interference channel.
Figure 17B:
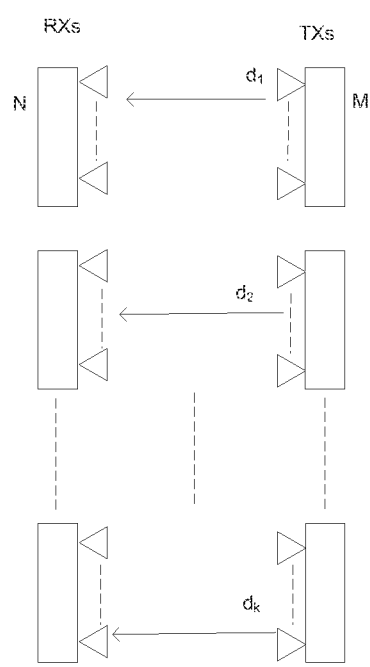
FIG. 17B is a schematic depicting a half duplex (HD) communication network.
Figure 17C:
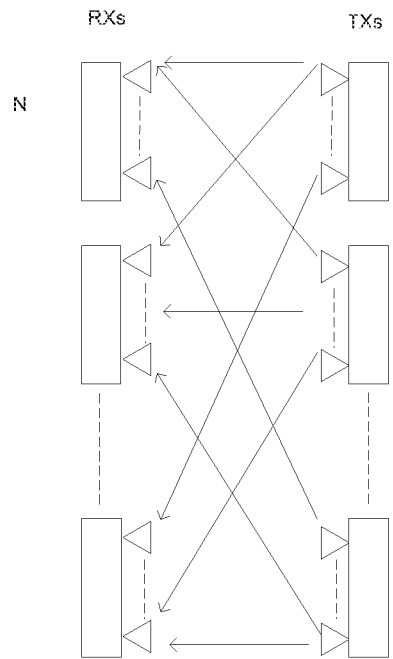
FIG. 17C is a schematic depicting a full duplex (FD) interference channel.
Figure 17D:
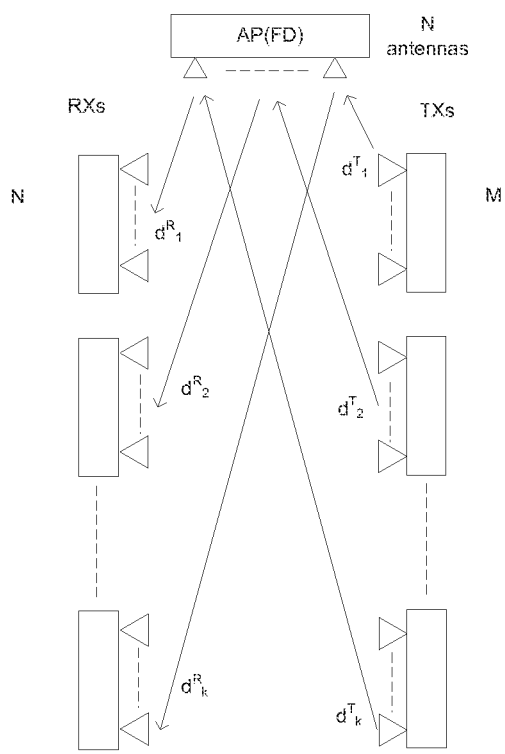
FIG. 17D is a schematic depicting a full duplex (FD) communication network.

FIGS. 17A to 17D depict a comparison of interference networks in half duplex (HD) and full duplex (FD) systems. FIG. 17A depicts a half duplex (HD) interference channel. FIG. 17B depicts a half duplex (HD) communication network. FIG. 17C depicts a full duplex (FD) interference channel. FIG. 17D depicts a full duplex (FD) communication network. One example of a T conventional HD interference channel is shown in FIG. 17A, where there are K links, each consisting of an M antenna transmitter communicating with an N antenna receiver. In IA theory, the DoF on each of the communication links (di, FIG. 17B) in this interference channel essentially correspond to the rank of the precoding matrices Vi and receive filters Uj such that:

$$U_j H_{ji} V_i = 0, \forall \neq j$$

$$\text{Rank}(U_j H_{ji} V_i) = d_i, \forall = j \qquad \text{Equation (32)}$$

Where $U_j$ and $V_i$ are of size $d_i \times N$ and $M \times d_i$ respectively, while Hji is the channel between receiver j and transmitter I and is of size N×M. While the first constraint ensures that interfering streams are aligned in the null space of the receivers, the second constraint ensures that $d_i$ DoFs are available for the desired streams at receiver of link i. For generic channel matrices H, it has been shown that it is sufficient to satisfy the first set of constraints (i.e IA), which automatically leads to the second set of constraints being satisfied. Based on the above constraints, one can easily obtain the following necessary conditions for a given network to support the desired DoFs (di, $\forall$i).

$$\Sigma_{i:(i,j) \in s} d_i(M-d_i) + \Sigma_{i:(i,j) \in s} d_j \leq min\{M,N\} d_j$$
$$(N-d_j) \geq E_{i,j:(i,j) \in s} d_i d_j \qquad \text{Equation (33)}$$

where $s \subseteq \epsilon = \{(i, j); i, j \in [1, K]\}$, the first condition indicates that on a link is limited by the minimum of the number of antennas on either ends of the communication link. The second condition indicates that to have a feasible IA solution, the system defined on any subset ($\epsilon$) of the interference constraints (i.e., s) must not be over-constrained. Note that matrices $V_i$ and $U_j$ are composed of $d_i$ and $d_j$ vectors respectively. Hence, a single interference constraint in Equation (32) between transmitter i and receiver j is comprised of $d_i d_j$ equations, while the transmitter and receiver give rise to $d_i (M-d_i)$ and $d_j (M-d_j)$ variables respectively. This condition may be referred to as the dimension counting argument.

The following description illustrates the principles of FD distributed interface channel. Referring to FIG. 17A, in the HD interference channel, the DoF (number of data streams) are defined on a per-link basis, with every receiver (receiving desired streams) being subject to interference from the transmitters of all the other links. Such an interference network (graph) captures even FD networks in the peer-peer mode. However, the case of distributed FD networks (in a single cell) is quite different for two reasons. (1) Here, all the desired streams either originate or terminate at a single common node, namely the AP (see FIG. 17D), which does not receive interference from any other node in the network (other than self-interference during FD, for which we assume ideal suppression). This results in an interference network (called full-duplex interference channel, FDIC) that is fully bipartite and decoupled from the desired/communication stream network as shown in FIGS. 17C and 17D. (2) Further, with no desired streams going between the nodes in the interference network (i.e. clients), this allows for the DoF notion to be applied on a per-node basis, with the uplink and downlink clients potentially operating on different DoF. The IA constraints for FDIC are as follows:

$$U_j H_{ji} V_i = 0, \forall_{i,j}$$

$$\text{Rank}(U_j H_{j0} V_0) = d_j^R, \forall_j \in \{\text{DL clients}\}$$

$$\text{Rank}(U_0 H_{0i} V_i) = d_i^T, \forall_i \in \{\text{UL clients}\} \quad \text{Equation (35)}$$

where index 0 represents the AP. While the first constraint ensures elimination of interference between "all" pairs of UL and DL clients, the last two constraints allow for varied DoF at each node, with $d_j^R$ and $d_i^T$ being the DoF for the downlink client (receiver) j and uplink client (transmitter) i respectively.

Figure 18A:
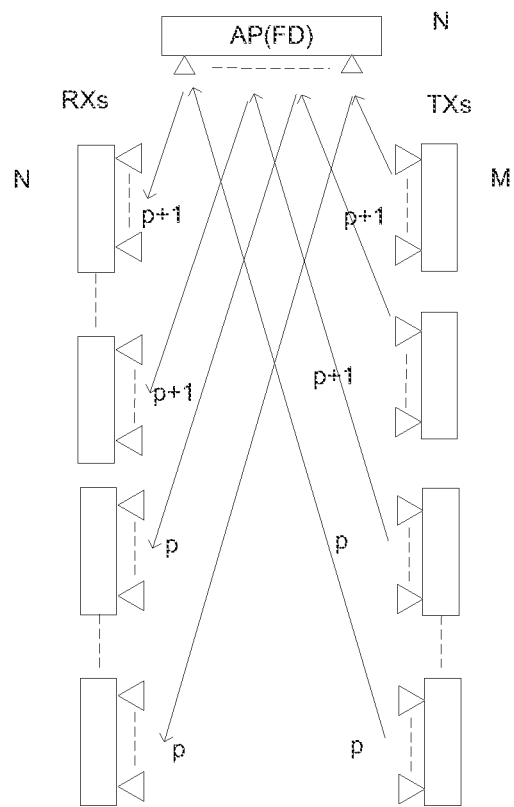
FIG. 18A is a schematic depicting a full duplex interface channel (FDIC) including an even number of clients.
Figure 18B:
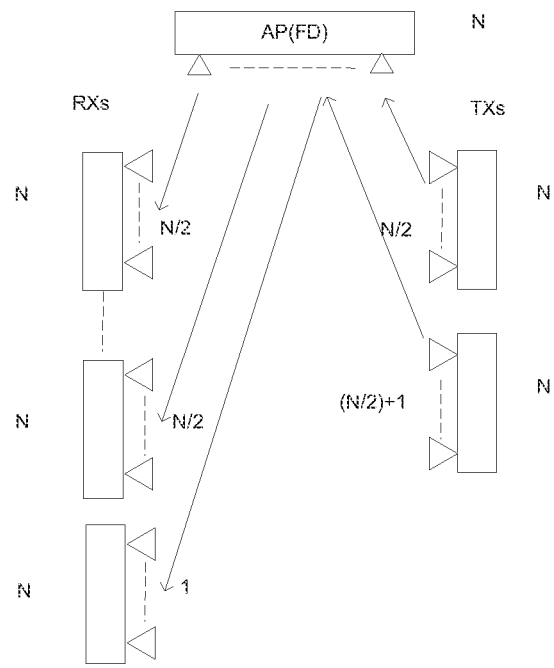
FIG. 18B is a schematic depicting a schematic depicting a symmetric full duplex interface channel (FDIC) including an odd number of clients.

In some embodiments, there can be some necessary conditions for FDIC. With IA in HD and peer-peer FD networks, the goal is to typically determine the maximum DoF that can be achieved over the interference network. In contrast, with the AP controlling (originating/terminating) all the desired streams in distributed FD networks, the maximum number of streams that can be enabled by an N transceiver AP is 2N streams. The number of antennas at each client is the same (N) and the aggregate streams (DoF) are uniformly distributed across the K clients (i.e. p or p+1 DoF at each client, where $$p = \left\lfloor \frac{N}{K} \right\rfloor;$$

i.e., N=pK+q; p, q∈Z$^+$; q<K in either direction as shown in FIG. 18A (clients with asymmetric antennas and DoF on DL and UL are considered in Section 5.4 of the appended article "Full-Duplex without Strings: Enabling Full-Duplex with Half Duplex Clients"). In view of the above, it has been determined that for N antenna HD clients, four clients are needed for IA to address UDI and enable 2N streams in symmetric FDIC, if N is even. If N is odd, six clients are needed, which reduces to five (FIG. 18B) in an asymmetric FDIC. This conclusion may be referred to as Lemma 10.

It is noted, that the condition on the minimum number of clients is only a necessary condition, and hence does not guarantee that a feasible IA solution can be found with four clients. The following provides that the structure of the interference in symmetric FDIC can be intelligently leveraged to construct a feasible IA solution that is implementation-friendly and can be realized with a small number of clients. An interference alignment network (IAN) is a subset of the original interference network that captures interference only due to transmit streams that need IA at the receivers. In other words, IAN discounts those interfering streams that can be suppressed by allocating an equivalent number of DoF at the receivers (i.e. interference suppression), thereby not requiring IA for handling those streams.

Figure 19A:
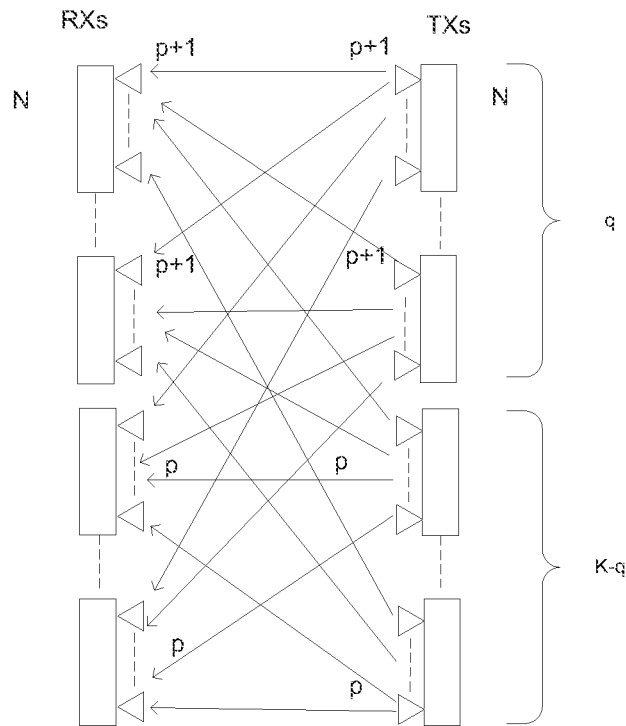
FIG. 19A is a schematic illustrating one embodiment of a full duplex (FD) interference network.
Figure 19B:
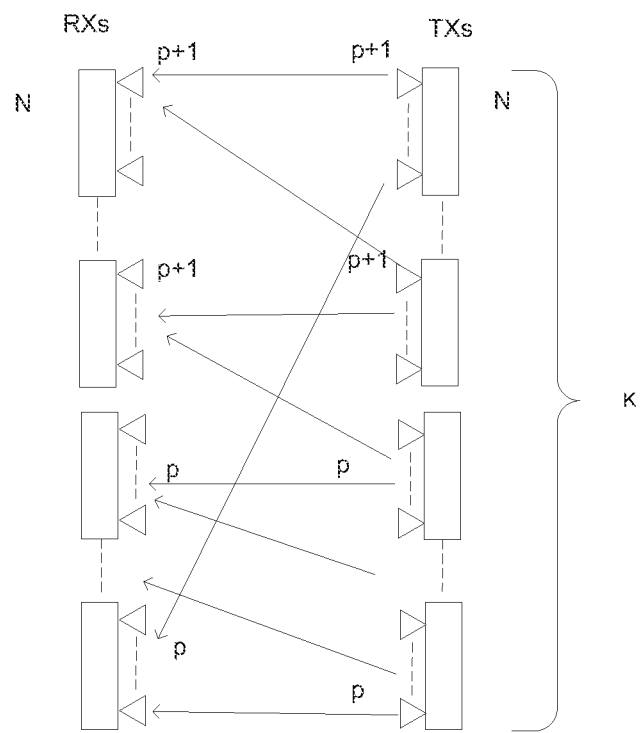
FIG. 19B is a schematic illustrating one embodiment of an interference alignment network (IAN).
Figure 19C:
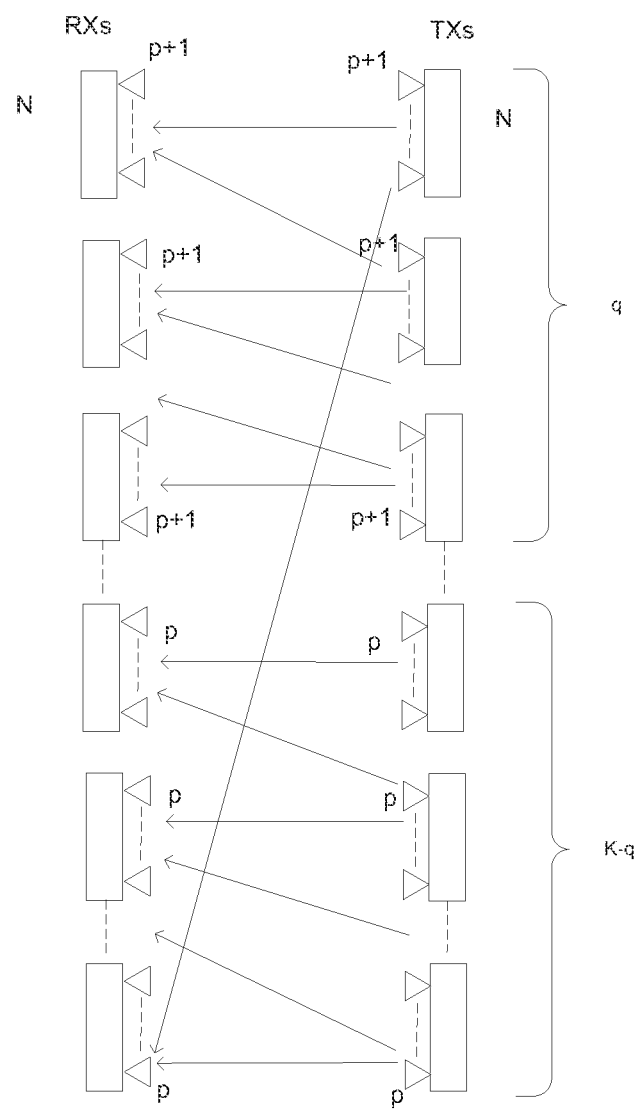
FIG. 19C is a schematic illustrating one embodiment of integrating a single cycle interference alignment network, as depicted in FIG. 19B, into a full duplex (FD) interference network, as depicted in FIG. 19A, with twice as many clients in the FD interference network depicted in FIG. 19A.

FIGS. 19A-19C depict some embodiments of interference alignment networks. FIG. 19A illustrates one embodiment of a full duplex (FD) interference network. In the example depicted in FIG. 19A (with q=0), there are four clients (K=4) each on the DL and UL in FDIC, each equipped with N=4 antennas (AP has 4 antennas as well) and requires only a single DoF (p=1) to generate a total of 8 DoF through FD. It is noted that all interfering streams do not need to be aligned in this example given the requirement of a single DoF with four available dimensions at each client. Hence, while the interference network is a fully bipartite graph, as shown in FIG. 18A, the resulting IAN is as shown in FIG. 19B (with K=4). Here, the IAN requires only two of the UL clients' streams to be aligned (using one DoF) at a DL client, while the other two UL streams are handled directly through interference suppression (using two DoF), thereby leaving one DoF for receiving the desired DL stream.

In view of the above, for N antenna HD clients, if the necessary conditions are satisfied, there exists a feasible IAN with at most one (un-directed) cycle that can enable 2N streams in symmetric FDIC. The proof is by means of providing a construction for a feasible IA solution.

IAN Construction: For example, to provide an IAN construction, in symmetric FDIC, q clients desire to send or receive p+1 streams, while the remaining K−q clients desire p streams. The necessary conditions have been shown to be satisfied for this interference network. The following IAN with a single cycle involving 2K clients as shown in FIG. 19C can now be constructed. There are three types of DL clients: (i) q of them requiring p+1 streams and receiving interference from 2(p+1) streams from two UL clients; (ii) K−q−1 of them requiring p streams and receiving interference from 2p streams from two UL clients; and (iii) one DL client requiring p streams and receiving interference from 2p+1 streams from two UL clients.

Feasibility: Consider a DL client requiring p+1 streams. $d_{IA}$=p+1 dimensions are used to align interference from a net 2(p+1) streams from the two UL clients (edges in IAN). Further, (K−2) edges, i.e. (K−q) edges with p streams each and (q−2) edges with p+1 streams each, are removed at the DL client (compared to interference network). This requires that $d_{IS}$=(K−q)p+(q−2)(p+1) dimensions are set aside at the client to handle these streams through interference suppression. This eventually leaves N−$d_{IA}$−$d_{IS}$=p+1 remaining dimensions, which is sufficient to handle the desired (p+1) streams at the client. Similarly, the desired streams at the other types of DL clients can also be shown to be supported by this IAN. Hence, the IAN is feasible and can support 2N streams through FD.

IA Solution: The construction is as follows. The individual IA conditions for this IAN can be given separately for the cyclic (top 2q nodes) and the non-cyclic (bottom 2(K−q) nodes) part as, $$H_{ii}V_i = {}^s H_{ik}V_k, \forall i \in [1,q], k=(i+1)(\text{mod})_q \quad \text{Equation (36)}$$

$$H_{ii}V_i = {}^s H_{ik}V_k, \forall i \in [1,q], k=(i+1)(\text{mod})K \quad \text{Equation (37)}$$

Substituting back in the cyclic component provides:

$$V_1 = {}^s (\pi_{i=q}^{1} H_{ik}^{-1} H_{ii}) V_1, k=(i+1)(\text{mod})q \quad \text{Equation (38)}$$

Thus, $V_1$ can be composed of any p+1 Eigen vectors of the matrix $\pi_{i=q}^{1} H_{ik}^{-1} H_{ii}$ to provide the required N×(p+1) matrix. The rest of the precoding matrixes in the cycle ($V_1$, i∈[2, q]) can be computed sequentially from the first set of constraints in Equation (37).

Since, the second set of constraints couple the rest of the precoding matrices (Vi, i∈[q+1,K]) to $V_1$ through DL client K (i.e. $V_K$), once $V_1$ is computed, they can be determined as well. However, these K−q precoding matrices are N×p in size compared to V1 that is N×(p+1) in size. Therefore, first $V_K$ is obtained as an N×(p+1) precoding matrix from $V_K = H_{K1}^{-1} H_{KK} V_1$. Since only p streams are transmitted by the UL clientK, p is picked out of the p+1 vectors in $V_K$ to make it N×p in size.

Thereafter, the remaining precoding matrices Vi, i∈[q+1, K−1] of size N×p can be sequentially obtained from $V_K$ from the second set of constraints in Equations (36) and (37).

The corresponding receiver filters ($U_i$) of dimensions N×(p+1) or N×p are obtained orthogonal to the sub-space spanned by $H_{ii} V_i$. When N=$K_p$, i.e. q=0, the IAN consists of a single Hamiltonian cycle, with all clients requiring the same streams as shown in FIG. 19B. This simplifies the solution to only the cyclic part of the generic N=$K_p$+q case, and would require only the first step of the construction, albeit applied over all the clients.

Since symmetric FDIC automatically results in IANs with at most a single cycle, this indicates that a feasible IA solution exists for the networks disclosed herein. Hence, the necessary conditions for IA in symmetric FDIC also serve as sufficient conditions.

FDoS solution: While a feasible IA can be constructed for any symmetric FDIC with 2K clients, to minimize the overhead of CSI from IA, the present solution enables FD with exactly four clients (two DL and two UL clients) with N 2 streams each. This is the smallest number of clients needed to realize 2N streams when N is even (here q=0). The IA construction is as follows.
(i) $V_1$ is composed of $$\frac{N}{2}$$

eigen vectors of the N×N matrix to result in N×N/2 precoding matrix for UL client 1.
(ii) V2 is again a N×N/2 precoding matrix for UL client 2 that is given by $V_2 = {}^s H_{12}^{-1} H_{11} V_1$.
(iii) From $V_1$ and $V_2$, the N/2 dimensional receiver filters for the two DL clients, namely $U_1$ and $U_2$ (matrices of size $$\frac{N}{2} \times N)$$

are obtained orthogonal to the sub-space spanned by $H_{11} V_1$ and $H_{22} V_2$ respectively.

Figure 20A:
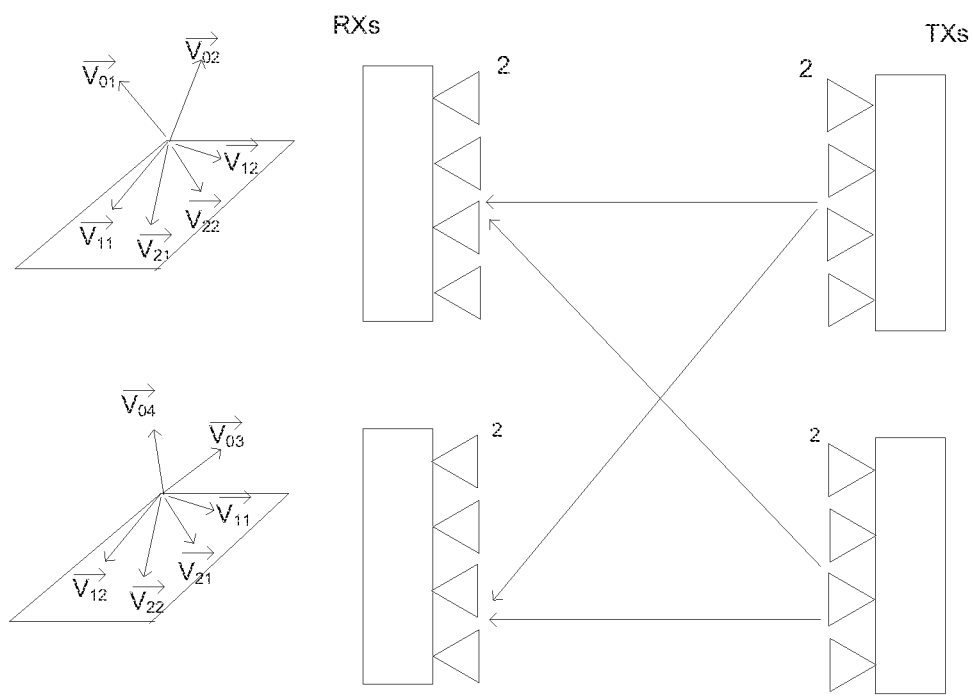
FIG. 20A is a schematic illustrating an example of interface alignment construction including 8 signal streams.
Figure 20B:
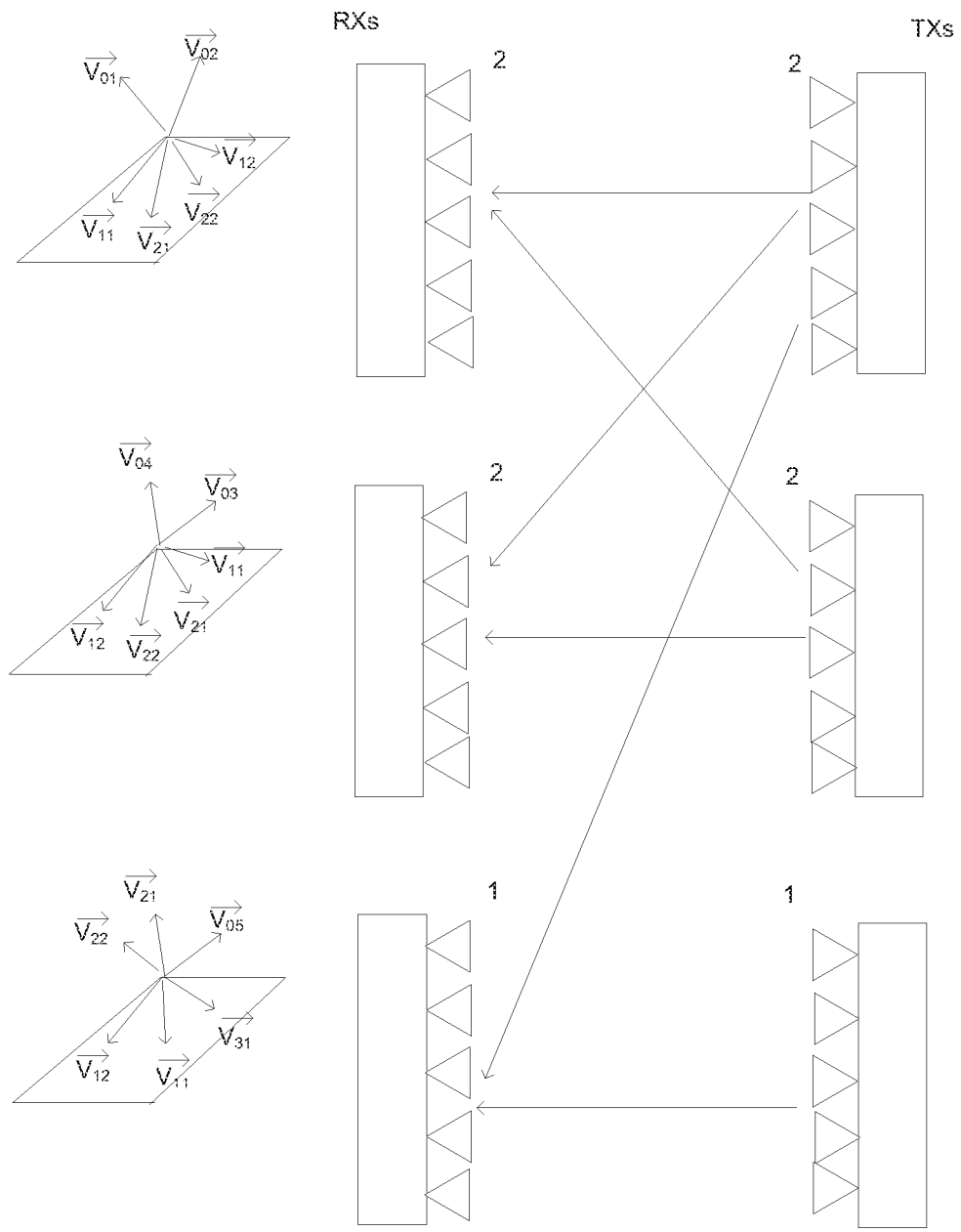
FIG. 20B is a schematic illustrating an example of interface alignment construction including 10 signal streams.

Similarly, when N is odd, our construction would require six clients (K=3) and would follow the appropriate procedure described above with respect to sections titled IAN constructions, feasibility, and IA solution, depending on whether N is a multiple of 3 or not. FIGS. 20A and 20B illustrates the IAN and IA construction pictorially for N=4 and N=5 respectively, wherein N is the number of antenna. In FIG. 20A there are 8 signal streams and in FIG. 20B there are 10 signal streams.

Figure 21:
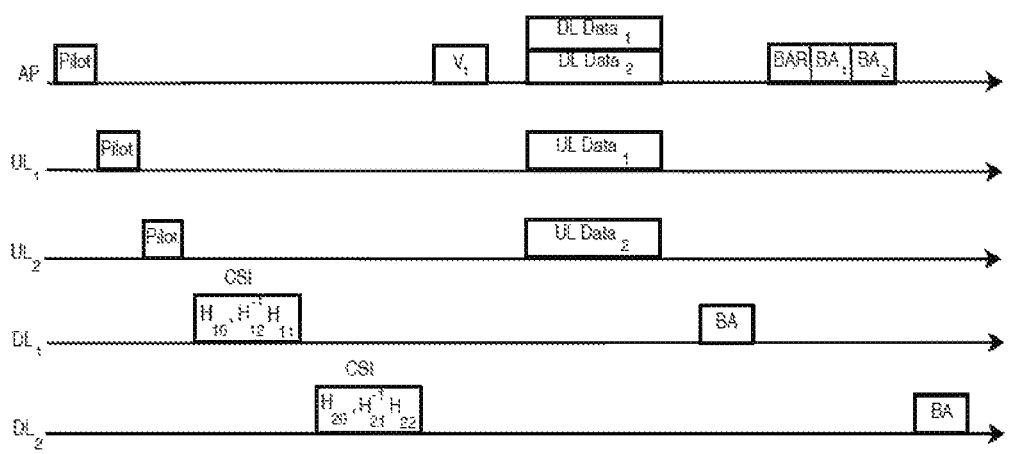
FIG. 21 is a timeline of a full duplex without strings (FDoS) system operation, in accordance with one embodiment of the present disclosure.

We now outline one embodiment of the complete sequence of steps in executing an FD session in FDoS with reference to FIG. 21. (1) Decide FD vs. HD: Based on desired scheduling/QoS policies (proportional fairness in our case), the four clients for a FD session in FDoS are chosen by the AP. Based on the number of antennas available at the clients, the total number of streams possible through FD can be determined using the instructions provided in Section 5.4 of the appended article "Full-Duplex without Strings: Enabling Full-Duplex with Half Duplex Clients", and compared against N streams possible with HD. FD is enabled only if it can enable a larger number of streams (than in HD).

(2) Channel Estimation and Feedback: Once FD is chosen, the clients in the session are notified. The channels between AP and the four clients as well as between the clients themselves are estimated, followed by the intelligent (reduced) feedback procedure as outlined in Section 5.3 of the appended article "Full-Duplex without Strings: Enabling Full-Duplex with Half Duplex Clients".

(3) Distributed Computation of Solution: In addition to determining its own precoder and receive filter, the AP disseminates the precoder for one of the UL clients. Using this, the rest of the precoder and receiver filters are computed locally at each of the clients, in accordance with Sections 5.2 and 5.3 of the appended article "Full-Duplex without Strings: Enabling Full-Duplex with Half Duplex Clients".

(4) Executing FD Session: The FD session is then enabled by the AP between the four clients in the symmetric (2M or 2N streams) or asymmetric (M+N streams) mode as appropriate. The AP serves as the point coordinator (e.g., cellular BS, PCF mode in 802.11) for the FD session.

(5) ACK Delivery: The delivery of ACKs follows a procedure similar to downlink MU-MIMO operation 802.11ac, wherein the AP solicits block ACKs (BA) from each of the MU-MIMO clients (except the first client) sequentially. In one example, in addition to a block ACK request (BAR) for the second DL client, the AP also needs to send back two ACKs to the two UL clients. This can be achieved by piggybacking the two ACKs for the UL clients onto the ACK-request for the second DL client as shown in FIG. 21, thereby not having to incur additional transmissions.

Figure 22:
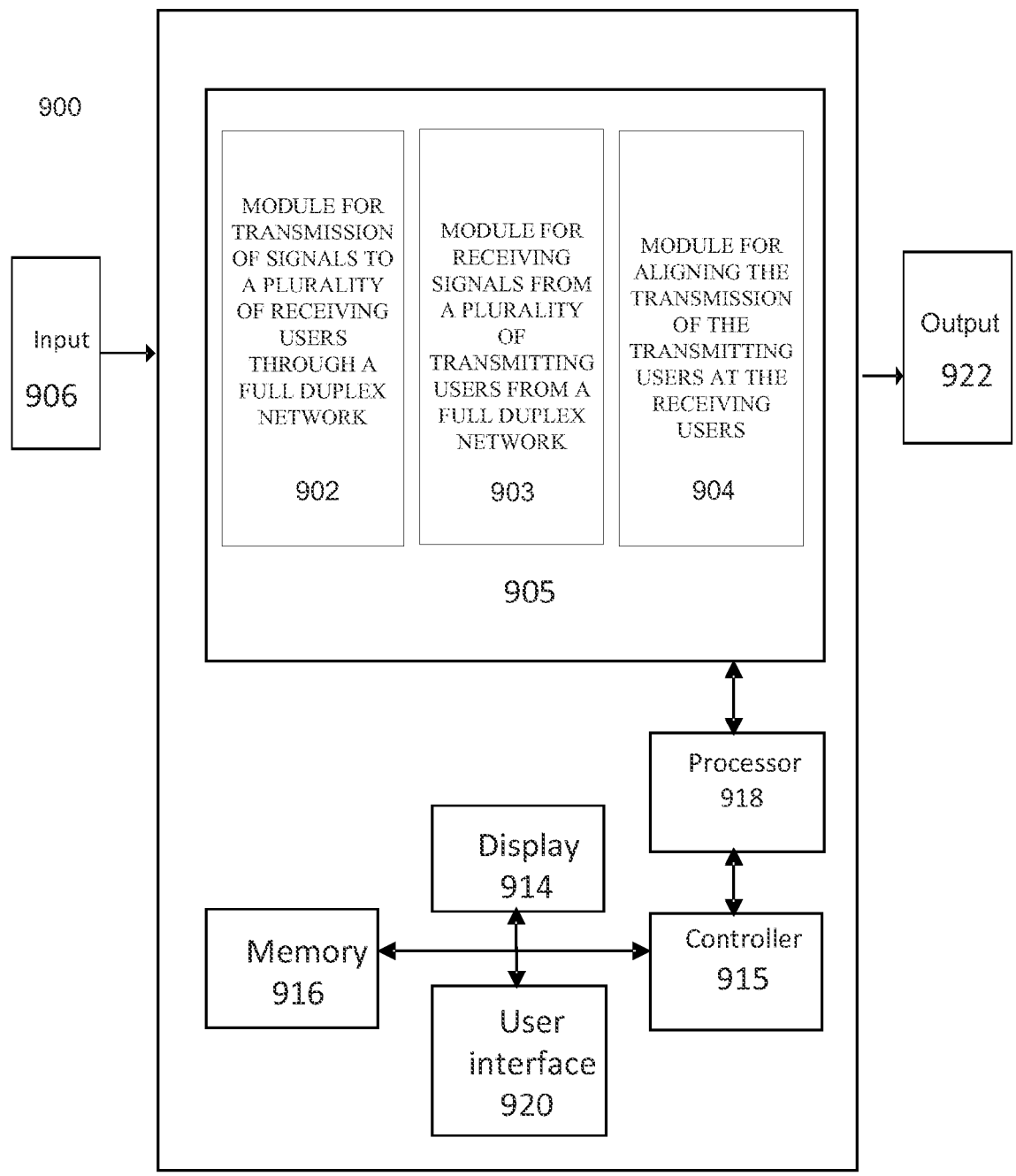
FIG. 22 is a block diagram of a system for providing full-duplex communication in a wireless network, in accordance with the present disclosure.

In another aspect of the present disclosure, a system for providing full-duplex communication in a wireless network is provided, as depicted in the block diagram this is provided by FIG. 22. The system for providing full-duplex communication in a wireless network includes a module for transmission of signals to a plurality of receiving users through a full duplex network 902, a module for receiving signals from a plurality of transmitting users from a full duplex network 903, and a module for aligning the transmission of the transmitting users at the receiving users.

In one embodiment, the system 900 preferably includes one or more processors 918, e.g., hardware processor, and memory 916 for storing applications, modules and other data. In one example, the one or more processors 918 and memory 916 may be components of a computer, in which the memory may be random access memory (RAM), a program memory (preferably a writable read-only memory (ROM) such as a flash ROM) or a combination thereof. The computer may also include an input/output (I/O) controller coupled by a CPU bus. The computer may optionally include a hard drive controller, which is coupled to a hard disk and CPU bus. Hard disk may be used for storing application programs, such as some embodiments of the present disclosure, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link.

The system 900 may include one or more displays 914 for viewing. The displays 914 may permit a user to interact with the system 900 and its components and functions. This may be further facilitated by a user interface 920, which may include a mouse, joystick, or any other peripheral or control to permit user interaction with the system 900 and/or its devices, and may be further facilitated by a controller 915. It should be understood that the components and functions of the system 900 may be integrated into one or more systems or workstations. The display 914, a keyboard and a pointing device (mouse) may also be connected to I/O bus of the computer. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

The system 900 may receive input data 906 which may be employed as input to a plurality of modules 905 that provide the module for the long term battery management layer 902 for estimating and managing a life cycle for the battery, and the module for the real time power management layer 904 for managing power sharing between the at least one battery storage element and the at least one capacitor storage element. The system 900 may produce output data 922, which in one embodiment may be displayed on one or more display devices 514. It should be noted that while the above configuration is illustratively depicted, it is contemplated that other sorts of configurations may also be employed according to the present principles.

Further details regarding the functionality of the modules 902, 903, 904 for the simultaneous full duplex transmission and reception of signals by a plurality of receiving and transmitting users across a wireless network, as well as the alignment, e.g., interference alignment, of the transmission signal at the receiving users, has been provided above with reference to FIGS. 1-20. In some embodiments, the system further includes at least one cell channel comprising an access point node, and a full bipartite interference channel (FBIC) configuration of a plurality of receiving nodes and a plurality of transmitting nodes. In some embodiments, each receiving node receives an interfering signal from all transmitting nodes, and the access point node of the cell channel provides a single node having downlink channels to all receiving nodes in the FBIC, wherein all of the uplink channels from the FBIC are to the single access point node to the single cell channel. Removing the interfering signal transmitted through the full bipartite interference channel (FBIC) configuration removes interference via interference alignment.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information", and has the title "Full-Duplex without Strings: Enabling Full-Duplex with Half Duplex Clients". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A communications method implemented in a communications node working in a full duplex mode and used in a wireless communications system, the communications method comprising: receiving, from a plurality of transmitting nodes, first communications data; simultaneously with the receiving, transmitting to a plurality of receiving nodes, second communications data; and deciding at least part of the transmit precoders and receive filters for alignment of interference from the plurality of transmitting nodes to the plurality of receiving nodes, wherein the precoders and receive filters for said alignment employ a full bipartite interference channel (FBIC), the FBIC including a single access point node that provides downlink channels to the plurality of receiving nodes, and the single the access point node also provides uplink channels to the FBIC, the first communications data having a number of streams less than the second communications data to provide a greater number of degrees of freedom for streams of second communications data that is interference free provided from the FBIC through the downlink channels to the plurality of receiving nodes;

wherein the number of the plurality of receiving nodes is limited up to 2, and the number of the plurality of transmitting nodes is limited up to 2 and wherein the communications node includes N antennas, the plurality of transmitting nodes use N/2 out of N degrees of freedom, and the plurality of receiving nodes use N/2 out of N degrees of freedom; and wherein the communications node simultaneously receives and transmits from greater than zero to a maximum number of 2N streams.

2. The communications method as in claim 1,
wherein each of the plurality of receiving nodes and the plurality of transmitting nodes works in a half duplex mode.

3. The communications method as in claim 1,
wherein the communications node comprises an access node or a baas station, and each of the plurality of transmitting noes and the plurality of receiving nodes comprise a mobile device, a client device or a user equipment.

4. The communications method as in claim 1,
wherein the transmit precoders and the receive filters are used for precoding and filtering, respectively, in at least one of time domain, subcarrier domain, and the space domain.

5. The communications method as in claim 1, wherein the deciding is performed in a distributed form.

6. The communications method as in claim 1, wherein the plurality of receiving nodes receive an uplink-downlink interference (UDI) signal from the plurality of transmitting nodes.

7. A communications method implemented in a receiving node used in a wireless communications system, the communications method comprising:

estimating a wireless channel between the receiving node and a transmitting node; deciding a receive filter for performing alignment of interference from the transmitting node to the receiving node;

receiving, from a communications node working in a full duplex mode, communications data; and applying the receive filter to the communications data wherein the receive filters for said alignment employ a full bipartite interference channel (FBIC), the FBIC including a single access point node that provides downlink channels to the receiving node, and the single access point node also provides uplink channels to the FBIC, the FBIC receiving a number of streams of data from the transmitting node less than the number of streams of data being sent from the FBIC to the receiving node to provide a greater number of degrees of freedom for streams of interference free data provided from the FBIC through the downlink channels to the receiving node;

wherein a number of receiving nodes is limited up to 2, and a number of transmitting nodes is limited up to 2 and wherein the communications node includes N antennas, the transmitting nodes use N/2 out of N degrees of freedom, and the receiving nodes use N/2 out of N degrees of freedom; and wherein the communications node simultaneously receives and transmits from greater than zero to a maximum number of 2N streams.

8. The communications method as in claim 7, wherein each of the receiving node and the transmitting node work in a half duplex mode.

9. The communications method as in claim 7, wherein each of the receiving node and the transmitting node works in a half duplex mode.

10. The communications method as in claim 7,
wherein the communications node comprises an access node or a base station, and each of the transmitting node and the receiving node comprises a mobile device, a client device, or a user equipment.

11. The communications method as in claim 7,
wherein the receive filter is used for filtering in at least one of time domain, subcarrier domain and space domain.

12. A communications method implemented in a transmitting node used in wireless communications system, the communications method comprising:
estimating a wireless channel between a receiving node and the transmitting node; deciding a transmit precoder for alignment of interference at the receiving node; transmitting, to a communications node working in a full duplex mode, communications data; and
applying the transmit precoder to the communications data, wherein the transmit precoder for said alignment employs a full bipartite interference channel (FBIC), the FBIC including a single access point node that provides downlink channels to the receiving node, and the single the access point node also provides uplink channels to the FBIC, the FBIC receiving a number of streams of data from the transmitting node less than the number of streams of data being sent from the FBIC to the receiving node to provide a greater number of degrees of freedom for streams of interference free data provided from the FBIC through the downlink channels to the receiving node;

wherein a number of receiving nodes is limited up to 2, and a number of transmitting nodes is limited up to 2 and wherein the communications node includes N antennas, the transmitting nodes use N/2 out of N degrees of freedom, and the receiving nodes use N/2 out of N degrees of freedom; and wherein the communications node simultaneously receives and transmits from greater than zero to a maximum number of 2N streams.

13. The communications method as in claim 12, wherein each of the receiving node and the transmitting node works in a half duplex mode.

14. The communications method as in claim 12, wherein the communications node comprises an access node or a base station, and each of the transmitting node and the receiving node comprise a mobile device, a client device or a user; equipment.

15. The communications method as in claim 12, wherein the transmit precoder is used for precoding at least one time domain, subcarrier domain and space domain.

* * * * *